United States Patent [19]
Deckers et al.

[11] Patent Number: 6,050,315
[45] Date of Patent: Apr. 18, 2000

[54] METHOD AND APPARATUS FOR PRODUCING FIBER REINFORCED STRUCTURES

[75] Inventors: Mark E. Deckers, Salt Lake City; Vernon M. Benson, South Jordan; Michael R. McCloy; Todd A. Rosevear, both of Salt Lake City; Dennis Hegerhorst, Payson; Boyd L. Hatch, West Valley; Keith G. Shupe, Bountiful, all of Utah

[73] Assignee: Alliant Techsystems Inc., Hopkins, Minn.

[21] Appl. No.: 09/070,445

[22] Filed: Apr. 30, 1998

[51] Int. Cl.⁷ .................................... B65H 81/00
[52] U.S. Cl. .................. 156/433; 156/425; 156/499; 156/517; 156/522; 156/523; 156/574
[58] Field of Search .................. 156/166, 169, 156/173, 175, 172, 433, 441, 425, 428, 429, 510, 499, 517, 522, 574, 523

[56] References Cited

U.S. PATENT DOCUMENTS

| | | |
|---|---|---|
| 3,551,237 | 12/1970 | Cox et al. . |
| 3,574,040 | 4/1971 | Chitwood et al. . |
| 3,772,126 | 11/1973 | Myers . |
| 3,962,393 | 6/1976 | Blad ........................ 264/101 |
| 4,137,354 | 1/1979 | Mayes, Jr. et al. ............. 156/175 |
| 4,248,649 | 2/1981 | Harrison et al. . |
| 4,470,860 | 9/1984 | Gill et al. . |
| 4,508,584 | 4/1985 | Charles . |
| 4,633,632 | 1/1987 | Sarh . |
| 4,735,672 | 4/1988 | Blad ........................ 156/433 |
| 4,872,619 | 10/1989 | Vaniglia . |
| 4,877,193 | 10/1989 | Vaniglia . |
| 4,907,754 | 3/1990 | Vaniglia . |
| 4,938,824 | 7/1990 | Youngkeit . |
| 4,943,338 | 7/1990 | Wisbey . |
| 5,015,326 | 5/1991 | Frank . |
| 5,045,147 | 9/1991 | Benson et al. . |
| 5,110,395 | 5/1992 | Vaniglia . |
| 5,145,543 | 9/1992 | Redd et al. . |
| 5,173,315 | 12/1992 | Charlson et al. . |
| 5,200,251 | 4/1993 | Brand . |
| 5,233,737 | 8/1993 | Policelli . |
| 5,290,389 | 3/1994 | Shupe et al. . |
| 5,472,553 | 12/1995 | Roberts . |
| 5,698,066 | 12/1997 | Johnson et al. . |
| 5,814,386 | 9/1998 | Vasiliev et al. ........... 428/36.3 |
| 5,871,117 | 2/1999 | Protasov et al. ........... 220/592 |

OTHER PUBLICATIONS

Ingersol Sales Brochure entitled "Automated Machinery for Composite Manufacturing," dated Aug. 9, 1989, pp. 1–3, 5–7.

European Search Report dated Jul. 28, 1999.

*Primary Examiner*—Jeff H. Aftergut
*Attorney, Agent, or Firm*—Trask, Britt & Rossa

[57] ABSTRACT

Method and apparatus for the manufacture of fiber reinforced structures wherein tooling and a delivery head are employed for the placement of discrete, elongated fiber elements in mutually superimposed relationship to define reinforcement or stiffening members on fiber elements for the interiors or exteriors of composite shells and the consolidation of the fibers to form the cured composite structure. A consolidation medium is provided for the positioning and control of the fiber elements on the hard tooling and during the curing of the fiber elements. Method and apparatus for the manufacture of fiber reinforced structures.

55 Claims, 25 Drawing Sheets

METHOD AND APPARATUS FOR PRODUCING FIBER REINFORCED STRUCTURES

BACKGROUND OF THE INVENTION

1. Field of the Invention

This invention relates to a method and apparatus for the manufacture of fiber reinforced structures. More specifically, the present invention relates to a method and apparatus for the fabrication of composite structures wherein tooling and a delivery head are employed for the placement of discrete, elongated fiber elements in mutually superimposed relationship to define reinforcement or stiffening members on fiber elements for the interiors or exteriors of composite shells and the consolidation of the fibers to form the cured composite structure.

2. State of the Art

It is desirable to have inexpensive, strong, lightweight, easily manufactured, dimensionally accurate components in a variety of sizes and geometries for use in aircraft and aerospace applications. Composite reinforced, or "grid-stiffened", shell structures, such as shrouds, casings, fuel tanks, airfoils, or wing skins, and fuselage panels, provide recognized advantages in aerospace applications over conventional metal assemblies, typically of aluminum or titanium, in terms of relatively lower weight and higher strength for the composite structures. However, meeting such criteria for components is difficult. The acceptance of all-composite structures has been hampered by the lack of demonstrated, repeatable, and inexpensive fabrication methodology and apparatus for effecting such in an automated manner. Composite structures have been found in high-performance military aerospace applications, where composite structures are formed in an non-automated manner at great expense. In non-aerospace applications, composite structures are more limited to applications where they can be formed as simple structures on existing machines. However, it is desirable to form complex reinforced composite structures for a wide variety of applications which are price competitive with metal structures and have lower weight and equal or better strength than such metal structures.

For example, commercial aircraft are typically powered using turbofan type engines. A turbofan type engine includes a ducted fan, a large diameter, axial-flow multi-stage compressor, as the primary source of thrust by the engine while the gas generator portion of the engine provides a smaller amount of the engine's thrust. Each stage of the ducted fan includes a number of fan blades attached to a rotating fan disc or hub to compress air, the compressed air flowing from the fan and expanding through a nozzle to provide thrust to move the aircraft. Depending upon the size of the engine, the diameter of each stage of the ducted fan may be approximately one meter to several meters or more in diameter and rotate at several thousand revolutions per minute. Each fan blade attached to a fan disc or hub is a highly stressed structure due to the forces acting on the blade from compressing the air flowing therearound and from the centrifugal forces acting on the blade during rotation of the engine.

Since weight is of concern in aircraft engines, it is desirable to provide the lightest engine possible to meet the operational criteria for the aircraft while providing the required aircraft operational safety. One of the desired operational safety characteristics for a turbofan aircraft engine is that if a fan blade catastrophically fails during engine operation, the blade or pieces of the blade be contained or caught within the fan housing structure to prevent damage to the aircraft, its cargo, and the surrounding engine and aircraft environment. Typically, aircraft manufacturers have required that the fan housing be such a structure for the engine thereby making the fan housing one of the heaviest engine components.

The design of an inexpensive, strong, lightweight, easily manufactured, dimensionally accurate fan housing in a variety of sizes and geometries for use in aircraft is a formidable task. For instance, the fan housing must be strong enough to contain the energy of a fan blade when the failure occurs at maximum engine speed, must be dimensionally accurate over a range of engine operating conditions, must be easily manufactured at a reasonable cost, must be lightweight, etc. Typically, fan housings have been metal structures using a variety of reinforcing grids, typically formed of metal. However, such fan housings are expensive, are difficult to manufacture, require extensive tooling to manufacture to close tolerances, and are heavy.

In other instances, some fan housings have been composite type structures including metal components and non-metallic or organic type reinforcing components in an attempt to provide a high strength, lightweight structure capable of containing a broken fan blade. However, such composite type structures are difficult to construct because the reinforcing structure of non-metallic materials for the far housing has been difficult and expensive to construct. Typically, such a non-metallic reinforcing structure has employed an isogrid type structure which is difficult to reliably fabricate in quantities. The isogrid type structure is efficient in providing reinforcement for the fan housing and the ability of catch a broken fan blade while maintaining its strength and integrity even with a portion missing or broken. A composite isogrid structure may require internal or external reinforcing elements or stiffeners, ribs, adjacent a continuous shell structure, to provide enhanced stiffness to the shell structure in terms of torsional and bending resistance. The larger the shell structure the greater the reinforcing requirement. The reinforcing elements may be discrete and remote from each other or, preferably, are in a grid structure. One favored grid structure is an isogrid of reinforcing elements at angles of approximately 60° with respect to an adjacent element.

Typically, such composite isogrid structures have been fabricated by hand by applying resin (epoxy) impregnated fiber element "tows" in a grid-like pattern using soft, imprecise tooling of wood, resilient materials, etc. which affects the isogrid structure's repeatability in manufacture, dimensional tolerance variation, structural integrity, cost, etc. A number of tows are typically laid-up on a mandrel or other tooling in vertically superimposed, or stacked, relationship to define each rib of the grid. The tows are then cured simultaneously under heat and pressure with a contiguous composite shell. However, such a process is not repeatable and the product not reproducible. Alternately, stiffeners may be fabricated by automated application, or "winding", of the fiber elements in the form of continuous filaments onto a cylindrical mandrel. However, filament winding has exhibited perceptible deficiencies in terms of inaccuracy of fiber placement, as well as compaction problems of the placed fiber. Also, the filament winding generates an excess of fiber scrap since it requires a continuous turnaround path when each end of a mandrel is reached; the filament turns around at the ends of the mandrel do not form part of the final structure, and, so, are cut off and discarded. Filament winding techniques provide no capability to "steer" the fiber filament to accommodated desired variations from a preprogrammed path to place fiber on complex geometry mandrels, including those exhibiting concave exterior portions, or to terminate fiber element placement at a target point on tooling and restart the application of a new fiber element at a new target point. Filament winding has particularly severe limitations where stiffening members cross or intersect, due to the inability to eliminate or reduce fiber element build-up at the nodes where fiber elements are oriented in two or more directions cross. Furthermore, filament winding techniques lack the capability to place fiber at a zero degree angle, i.e., parallel, to the longitudinal axis of rotation of the mandrel. Therefore, a need exists for a method and apparatus for the fabrication of composite structures, such as an isogrid structure, to maintain the integrity, reliability, repeatability of manufacture, dimensional control, and cost of the structure. A need exists for an apparatus capable of placing discrete fiber elements in desired lengths and at desired angles along specified paths onto tooling so as to form stiffening structures onto which a blanket of composite fibers may be laid up to form the desired structure and the fibers cured to yield the desired structure.

SUMMARY OF THE INVENTION

The present invention relates to a method and apparatus for the manufacture of fiber reinforced structures. More specifically, the present invention relates to a method and apparatus for the fabrication of composite structures wherein tooling and a delivery head are employed for the placement of discrete, elongated fiber elements in a mutually superimposed relationship to define reinforcement or stiffening members on fiber elements for the interiors or exteriors of composite shells and the consolidation of the fibers to form the cured composite structure. The present invention includes the fiber placement apparatus and the composite structure tooling as well as their use for the manufacture of reinforced structures. The apparatus includes a delivery head and hard tooling for the fiber elements to be applied thereto. A consolidation medium is provided for the positioning and control of the fiber elements on the hard tooling as well as during the curing of the fiber elements.

DESCRIPTION OF THE DRAWINGS

For a more complete understanding of the present invention and the advantages thereof, reference should be made to the following detailed description taken in connection with the accompanying drawings in which.

DESCRIPTION OF THE INVENTION

Referring to drawing FIGS. 1 through 6, the structure and operation of a preferred embodiment 1000 of the composite fiber element placement apparatus of the present invention will be described.

Fiber placement apparatus 1000 is mounted to offset mounting adapter 1012, which is affixed to a mounting frame 202 (shown in broken lines in FIG. 1) of a carriage 200 or other mounting structure proximate a mandrel or other tooling to which fiber element tows are to be applied by apparatus 1000. An upright base mount 1014 secures apparatus 1000 to mounting adapter 1012 via a plurality of cap screws 1016, which extend through washers 1018, and the heads of which are contained within counterbores 1020 in the forward surface of base mount 1014. Of course, other means might be employed to secure apparatus 1000 to mounting adapter 1012 or directly to a mounting frame 202 or other mounting structure.

Figure 5:
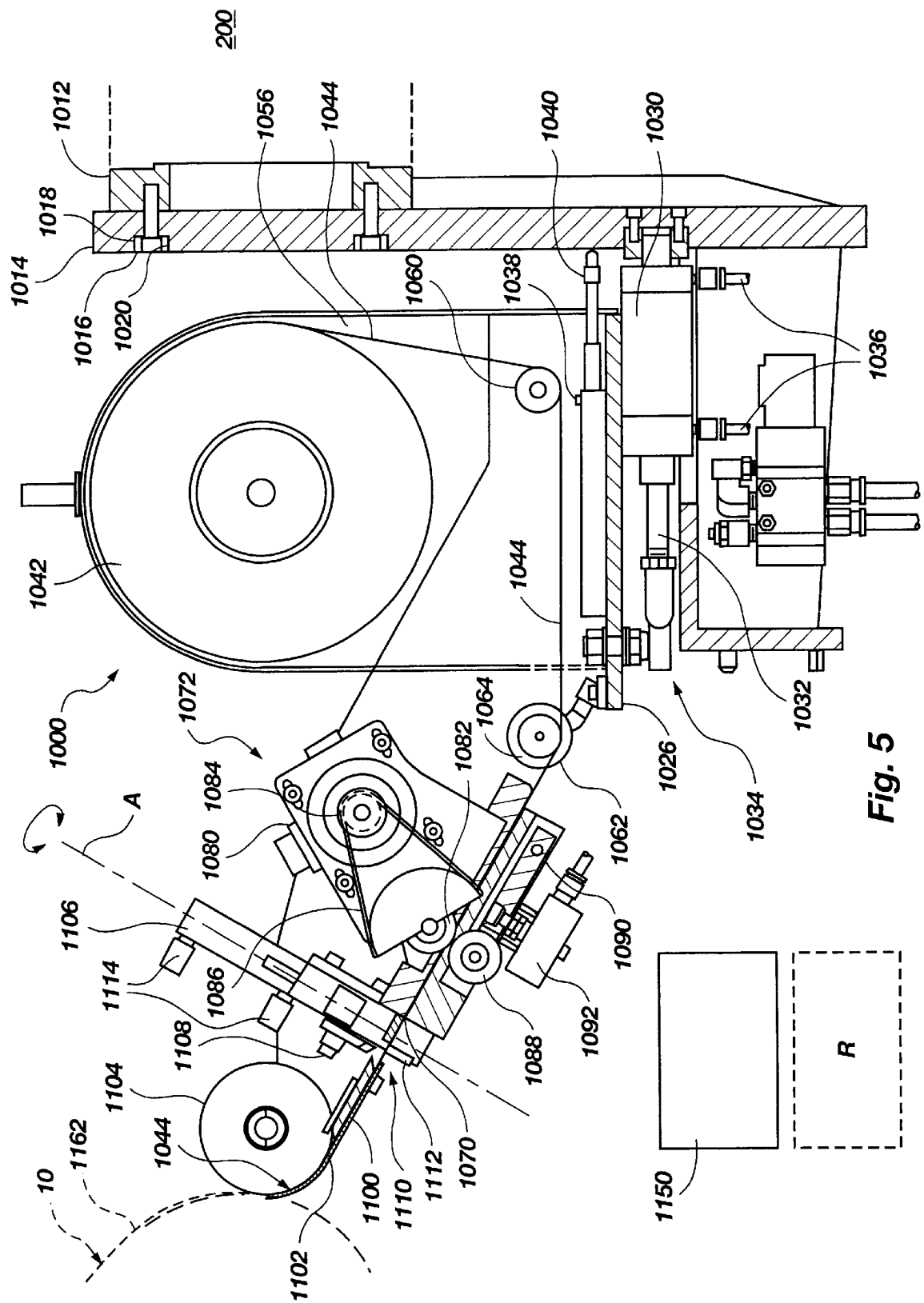
FIG. 5 is a side sectional elevation of the apparatus shown in drawing FIG. 1.

A frame subassembly 1026 is horizontally slidably mounted to base mount 1014 so as to be capable of controlled travel toward and away from the mandrel or other tooling 10 to which fiber tows are to be applied. Such controlled travel is effected in part by supporting the weight of apparatus 1000, but for base mount 1014 and mounting adapter 1012, on parallel linear slides 1028 (see FIG. 3) which extend transversely to base mount 1014. In addition, an actuator preferably in the form of a double-acting pneumatic cylinder 1030 is secured at the rear end of apparatus 1000 to base mount 1014, and the shaft 1032 of pneumatic cylinder 1030 is secured to frame subassembly 1026 at 1034 (FIG. 5). Cylinder 1030 thus effects fore-and-aft movement of the apparatus components mounted to frame subassembly 1026 responsive to pneumatic pressure opposingly applied through air lines 1036 and under control of a programmed machine controller 1150. By way of example only, a preferred fore-and-aft travel distance for frame subassembly 1026 is approximately 2.5 inches. A measuring gage encoder 1038, such as the Model P40 Measuring Gauge, available from Gurley Precision Instruments of Troy, N.Y., is secured to frame subassembly 1026 and located to detect the precise position of frame subassembly 1026 responsive to travel of spring-loaded encoder probe 1040, which remains in contact with base mount 1014.

A spool 1042 having composite fiber element 1044 wound therearound is carried by frame subassembly 1026, preferably mounted in a cantilevered fashion on a spindle extending horizontally from upstanding strut 1046 secured to base 1048 of creel 1050. Creel 1050 also includes removable hood 1052, which extends over spool 1042 and which is releasably secured to each side of creel base 1048 by clamp assemblies 1054. The spool holder zone 1056 within the creel 1050 is temperature controlled by a flow of conditioned air thereinto through cold air inlet port 1058 (see FIG. 2) fed by vortex cooler 1059 in order to preclude the impregnated fiber from becoming too tacky or too inflexible on the spool. The air flow exits the spool holder zone 1056 through gaps between the hood 1052 and portions of frame subassembly 1026.

Fiber element 1044, which may comprise a single tow of (for example) one-eighth (0.125) inch or one-quarter (0.25) inch width and comprised of a plurality of mutually parallel, epoxy resin-impregnated carbon fibers, which are fed downwardly from the rear of spool 1042 onto and about rear guide, or redirect, roller 1060 mounted to frame subassembly 1026 to change the direction of fiber element 1044 approximately 90° and toward the tooling. Tray redirect roller 1062, also mounted to frame subassembly 1026, in turn directs fiber element 1044 to guide tray 1070. Rear redirect roller 1060 is laterally sized to accommodate any tow width usable with apparatus 1000, but tray redirect roller 1062 is preferably sized to accommodate a specific tow, or multiple-tow band, width, extending flanges 1064 of roller 1062 laterally constraining fiber element 1044. Rollers 1060 and 1062 are preferably provided with a suitable covering of, for example, polytetrafluoroethylene (sold as Teflon® polymer) to substantially preclude adhesion of the resin-impregnated fiber element 1044 thereto.

Guide tray 1070, also mounted to frame subassembly 1026, maintains precise positional control of fiber element 1044 as it progresses through the cut/add module 1072 and to the guide or delivery chute 1100. Servo motor 1080 powers drive roller 1082 through timing pulley 1084 and timing belt 1086, and clamp roller 1088 is pivotally mounted at 1090 and selectively powered pneumatically by actuator 1092 to press fiber element 1044 against drive roller 1082. Drive roller 1082 and clamp roller 1088 are provided with a suitable covering such as urethane to provide traction and surface compliance to advance fiber element 1044 as clamp roller 1088 is actuated against drive roller 1082. Servo motor 1080 is operated in a closed loop position mode to ensure that fiber element 1044 reaches the tooling at the target location. Guide or delivery chute 1100, which receives fiber element 1044 from guide tray 1070 and is secured thereto, is laterally sized to precisely laterally constrain fiber element 1044 as it travels to guide scoop 1102 adjacent compaction or delivery roller 1104, which is also precisely laterally sized to the specific tow or band width of the fiber element 1044. Double-acting pneumatic knife actuator 1106 is positioned transversely to the path of fiber element 1044 through guide chute 1100 so that knife blade 1108 may be positively advanced through severance gap 1110 in guide chute 1100 to contact fiber element 1044 and sever it into a tow or band of discrete length adjacent anvil 1112. Knife actuator 1106 is selectively powered through compressed air lines 1114. It should be understood that clamp roller actuator 1092 and knife actuator 1106, or either of them, may be driven electrically rather than pneumatically, and that a single-acting knife actuator using a spring return may also be suitably employed in lieu of a double-acting actuator.

Optionally, a second vortex cooler 1059 may be employed to generate cooling air delivered by tubing or other conduit 1061 to the cut/add module 1072 in the vicinity of the path of fiber element 1044 therethrough to keep rollers 1082 and 1088, knife blade 1108, anvil 1112 and guide tray 1070 cool to reduce resin buildup from the passage of fiber element 1044.

Compaction roller 1104 is an unpowered, or free-wheeling, roller which rotates responsive to fiber element 1044 being paid out onto the tooling at a target location. Guide scoop 1102, extending from the end of guide chute 1100 follows the curvature of the outer periphery of compaction roller 1104 and is spaced therefrom a substantially continuous radial distance slightly larger than a thickness of fiber element 1044. The outer periphery of compaction roller 1104 is preferably covered with an elastomeric material, such as rubber, conformable to the surface contour of the mandrel or other tooling 10 or to previously-applied tows to ensure consistent and uniform application, compaction and adherence of the tows. As may be seen in drawing FIGS. 1 and 3, roller 1104 is preferably biased toward a central position on its shaft 1120, which is mounted at each end to nose piece 1121, by coil springs 1122 acting on both sides of the hub of roller 1104. The precise lateral position of roller 1104 during operation is detected by encoder 1124, probe 1126 of which lies adjacent one side of roller 1104. Encoder 1124 may also comprise the previously-mentioned Model P40 Measuring Gauge from Gurley Precision Instruments. As a result of this positional monitoring in combination with the spring-biased, free-floating lateral action of the compaction roller 1104, the lateral position of roller 1104 on shaft 1120 is reported back to the machine controller 1150 so that the motion of the apparatus 1000 may be fine-tuned for optimum tracking of the mandrel for fiber delivery and compaction in a "self-teach" mode. In addition, the floating action of the compaction roller 1104 was to protect the tooling from damage which might occur if the lateral motion of the roller 104 were constrained.

It should be noted again at this juncture, and specifically with reference to drawing FIG. 5, that the path of fiber element 1044 from spool 1042 to compaction roller 1104 is relatively simple and unconvoluted in comparison to conventional apparatus for fiber element application. For example, the path of fiber element 1044 is redirected far less than 180°, and actually only in the range of about 110° to about 130° (depending on how full spool 1042 is), from its initial downward path from spool 1042 until it reaches the periphery of compaction roller 1104, so that undue bending and twisting of fiber element 1044 is eliminated, preserving the integrity of the fiber element. In addition, it should also be noted that the path of fiber element 1044 between tray redirect roller 1062 and the periphery of compaction roller 1104 is substantially linear to better ensure that the maximum surface area of fiber element 1044 is presented to tooling 10 (or to a previously-applied tow) and pressed firmly thereagainst with the individual fibers of the element aligned in parallel and with an even distribution of resin.

Compaction roller 1104 applies fiber element 1044 to the tooling using compaction force against tooling 10, preferably under elevated temperature conditions. Compaction force is provided by double-acting pneumatic cylinder 1030, previously described. Heat is provided to the compaction zone on the tooling 1160 to render the epoxy resin of fiber element 1044 tacky to enhance adherence thereto or to previously-laid tows by a hot air torch 1130 (FIG. 1), the fan-shaped nozzle 1132 of which lies immediately below compaction roller 1104 and guide scoop 1102.

In operation of apparatus 1000 of the invention, fiber element 1044 is fed to compaction roller 1104 under control of programmed machine controller 1150. The target start point on the tooling 10 for commencement of application of a discrete segment, or tow, of fiber element 1044 has been selected, and fiber element 1044 has been advanced to compaction roller 1104 by the cooperation of drive roller 1082 and clamp roller 1088. Apparatus 1000 may either be mounted to a carriage 200 traversable in a direction parallel to the longitudinal axis or direction of elongation of the mandrel or other tooling 10 through mounting adapter 1012 to effect lateral movement parallel thereto to facilitate application of fiber element tows 1162 at positions along the entire length thereof, or the mandrel or other tooling 10 may be mounted for such lateral movement past apparatus 1000. Preferably, carriage 200 comprises part of a six-axis fiber placement machine of the type disclosed in U.S. Pat. No. 4,867,834, so that tows may be placed at any position and angle on the mandrel or other tooling. The referenced axes include the aforementioned longitudinal carriage movement, as well as radial carriage movement transverse to the longitudinal axis of the mandrel, roll, pitch and yaw movement of the apparatus 1000 with respect to carriage 200, and rotation of the mandrel or other tooling 10 about its longitudinal axis. As used herein with respect to movement of the apparatus, "roll" identifies rotational motion about a horizontal axis perpendicular to the mandrel axis, "pitch" identifies rotational motion about a horizontal axis parallel to the mandrel axis, and "yaw" identifies rotational motion about a vertical axis. Most preferably, carriage 200 comprises part of a multi-axis fiber placement machine affording seven axes of motion for tow placement, including the aforementioned six as well as an ability to alter the elevation of apparatus 1000. It should again be noted that the self-contained nature of the apparatus of the present invention, including its own supply of fiber element 1044, facilitates rotation of apparatus 1000 about an axis perpendicular to the tooling 10 and thus permits running of tows parallel to the tooling axis.

In either case, when the compaction roller 1104 is adjacent the target fiber application start point, the apparatus 1000 is driven forward by pneumatic cylinder 1030 against the tooling 10, which rotates about its axis while fiber element 1044 is applied thereto and compacted thereagainst by roller 1104 while heat is applied by torch nozzle 1132. Drawing FIG. 5 schematically depicts application of fiber element 1044 in the form of a tow 1162 (shown in broken lines) to tooling 10. Of course, relative movement of either tooling 10 or apparatus 1000 along the longitudinal axis of the tooling 10 may be simultaneously effected so that a tow 1162 comprising a portion of fiber element 1044 may be applied in any desired angular direction. When the controller 1150 detects that an appropriate length of fiber element 1044 has been paid out from spool 1042, it actuates knife actuator 1106 at a time that ensures that the "tail" of the tow downstream of knife actuator 1106 is the correct length to complete application of the tow 1162 to the tooling 10 at a target endpoint. The apparatus 1000 and tooling are then moved, and/or rotated in the case of the tooling 10, to a new tow target start point, fiber element feed is restarted, and the new tow applied and compacted under heat and pressure. By multiple applications of superimposed or stacked tows 1162, reinforcing ribs or "stiffeners" 1164 may be built up on the tooling or mandrel 10 as shown in drawing FIG. 6. Further, and also as shown in drawing FIG. 6, tows 1162 may be easily laid in different directions so as to overlap or intersect at nodes 1166 to define a grid pattern of stiffeners 1164 as previously mentioned. The cut and add capability of apparatus 1000 also facilitates fabrication of nodes with abutting, rather than overlapping, tows 1162 running in different directions, or a combination of abutting and overlapping tows 1162, as dictated by the programming of controller 1150. It is further contemplated that the knife actuator, which also carries anvil 1112, may be mounted so as to rotate about an axis A (see FIG. 5) intersecting and perpendicular to the path of fiber element 1044 through guide chute 1100 responsive to rotational drive unit R shown schematically in broken lines under control of controller 1150. In such a manner, when using a knife blade 1108 and anvil 1112 of greater width than fiber element 1044 to be severed, the cut angle of the fiber element 1044 may be changed as required to match the cut angle of the knife blade 1108 to the crossover angle between tows 1162 being applied in different directions so that a leading end surface 1170 of a first tow 1162 and a trailing end surface 1172 of a second tow 1162 (see FIG. 7) will each lie substantially parallel to a side 1174 of a previously-applied tow 1162 against which that respective end surface abuts (leading and trailing ends 1170 and 1172 shown slightly spaced from sides 1174 for clarity in FIG. 7).

Figure 8:
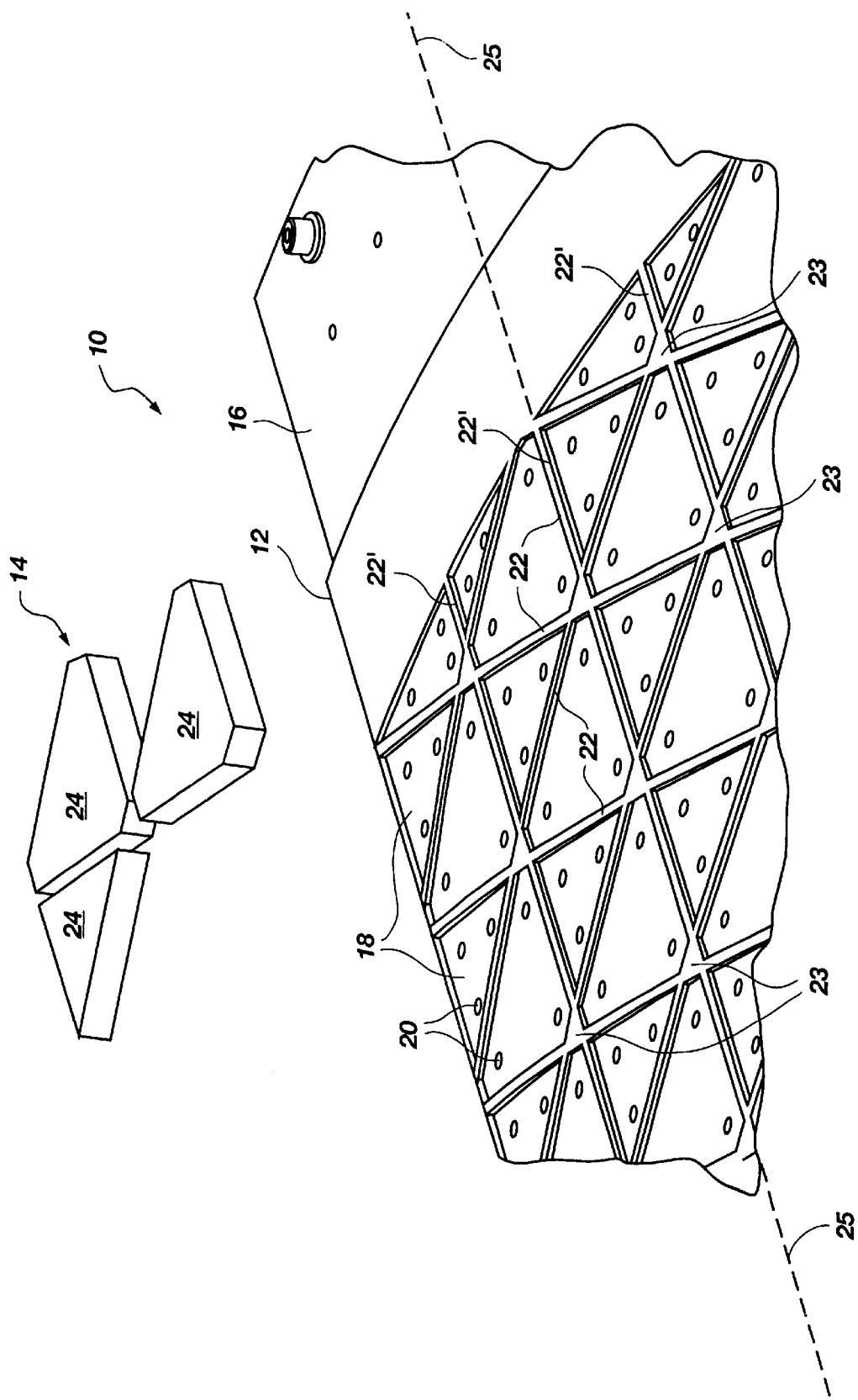
FIG. 8 is a view of a portion of the tooling used in a first embodiment of the present invention.

Referring to drawing FIG. 8, illustrated is a portion of the tooling assembly 10 of the present invention including a portion of the hard tooling 12 and the consolidation medium 14. The hard tooling 12 may be formed in any desired convenient shape or configuration, such as flat, annular, circular, conical, pyramidal, rectangular, etc., for the manufacture of a reinforced structure, such as an isogrid structure, or any convenient desired composite reinforced structure. In this instance, the portion of the hard tooling 12 includes a metal sheet 16 having a plurality of recessed pockets 18 therein having, in turn, a plurality of apertures 20 therein and a plurality of ribs 22 for the support of the fiber element (not shown) applied thereto extending between the pockets 18. The recessed pockets 18 and ribs 22 may be any desired shape or configuration for the desired composite structure to be formed. The ribs 22 may be at any desired angle with respect to an adjacent rib 22 and/or may extend parallel to the direction of the rotational axis 25 of a mandrel upon which the tooling 12 may be installed, such as rib 22' of tooling 12. The intersection of the ribs 22, 22' occurs at nodes 23 of the tooling 12, such nodes 23 being any desired shape formed by the intersection of the ribs 22, 22'. Each recessed pocket 18 may have any desired number of apertures 20 therein used to receive and retain a portion of the consolidation medium 14 therein. The ribs 22, 22' may be of any desired width or shape, depending upon the composite structure to be formed on the hard tooling by the application of fiber element thereto. If desired, the hard tooling 12 may not have recesses 18 formed therein but merely contain a plurality of apertures 20 therein.

The consolidation medium 14 includes a plurality of individual consolidation blocks 24, each block having a shape to fit within a corresponding recessed pocket 18 of the hard tooling 12, the shape of each consolidation block 24 being the desired shape of the corresponding recessed pocket 18. Each consolidation block 24 has a thickness or height sufficient to allow the formation of the desired composite structure on the hard tooling 12 when the consolidation block 24 has been assembled thereon in a corresponding recessed pocket 18. Each consolidation block 24 is formed from any desired structurally material capable of holding its shape during the formation of the composite structure during fabrication and curing, such as steel, aluminum, titanium, alloys thereof, silicon elastomeric material, high durometer elastomeric material, high melting temperature plastic material, ceramic material, etc. The consolidation blocks 24 and the hard tooling 12 should be easily machinable or formable for the desired composite structure to be formed therewith as well as it is desirable for them to be lightweight for handling purposes. The consolidation blocks 24 are retained within the recessed pockets 18 of the hard tooling by any suitable means, such as pin connections, threaded connections, resilient spring connections, etc. For precision control of the composite structure to be formed using the hard tooling 12, each consolidation block 24 should fit within its corresponding recessed pocket 18 with a minimum of clearance, such as, for instance, 0.010 inches clearance. In this manner, the composite structure to be formed using the consolidation blocks 24 and hard tooling 12 may be precisely controlled dimensionally.

Figure 9:
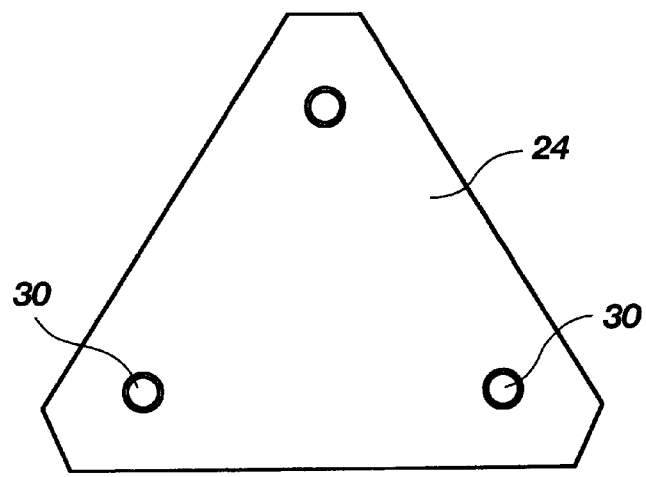
FIG. 9 is bottom view of a tooling block used in the present invention.

Referring to drawing FIG. 9, a consolidation block 24 is illustrated from the bottom thereof. The block 24 includes a plurality of pins or nubs 30 thereon which are received within apertures 20 of the sheet 16 of the hard tooling 12 (see FIG. 1). As stated, the consolidation block 24 may be of any desired shape to form the composite structure using the consolidation blocks 24 and hard tooling 12 as well as any desired number of pins 30 to be included on a block 24 to precisely retain block 24 within the recessed pocket 18.

Figure 10:
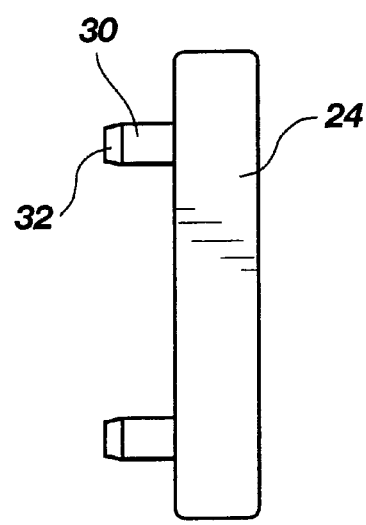
FIG. 10 is a side view of the tooling block illustrated in drawing FIG. 9 used in the present invention.

Referring to drawing FIG. 10, a consolidation block 24 of consolidation medium 14 is illustrated from a side view with the plurality of pins 30 thereon which are received within apertures 20 of the sheet 16 of hard tooling 12 to locate and retain the block 24 within the recessed pocket 18. The pins 30 may be of any desired length, size, and suitable material for the precise location and retention of the consolidation block 24 on the hard tooling 12. Each pin may, if desired, include an annular chamfered surface 32 thereon to aid in the insertion of the block 24 Within an aperture 20 of the sheet 16 of hard tooling 12.

Figure 11:
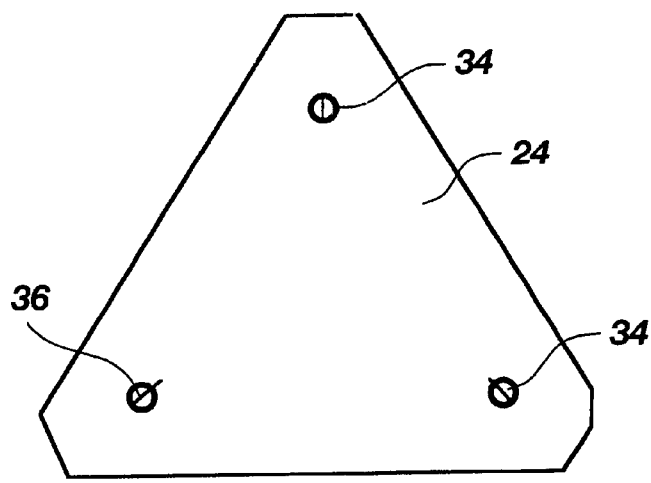
FIG. 11 is a bottom view of another tooling block used in the present invention.

Referring to drawing FIG. 11, a consolidation block 24 of consolidation medium 14 is illustrated from the bottom thereof having alternative resilient or spring type connections 34 thereon. As illustrated, the consolidation block 24 includes a plurality of resilient spring type connections 34 thereon which are received within apertures 20 of the sheet 16 of the hard tooling 12 (see FIG. 8). As stated, the consolidation block 24 may be of any desired shape to form the composite structure using the consolidation blocks 24 and hard tooling 12 as well as any desired number of resilient spring type connections 34 to be included on a block 24 to precisely retain block 24 within the recessed pocket 18. The resilient spring type connections 34 may have a pin (not shown) or suitable member inserted through the end portion 36 thereof to retain the resilient spring type connection in the aperture 20 in the sheet 16 of the hard tooling 12.

Figure 12:
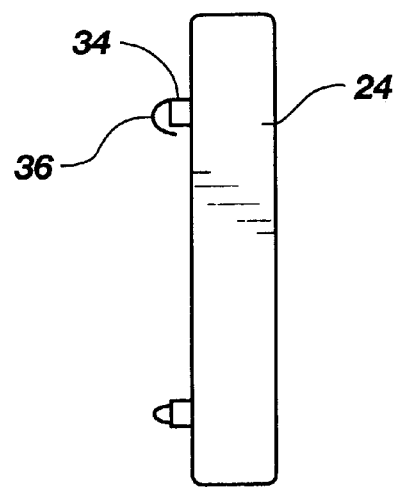
FIG. 12 is a side view of the tooling block illustrated in drawing FIG. 11 used in the present invention.

Referring to drawing FIG. 12, a consolidation block 24 of the consolidation medium 14 is illustrated from a side view with the plurality of resilient spring type connections 34 thereon which are received within apertures 20 of the sheet 16 of hard tooling 12 to locate and retain the block 24 within the recessed pocket 18. The resilient spring type connections 34 may be of any desired length, size, and suitable material for the precise location and retention of the consolidation block 24 on the hard tooling 12. Each resilient spring type connection 34 may, if desired, include an end portion 36 thereon to engage a pin (not shown) or other suitable member to retain the resilient spring type connection 34 within an aperture 20 of the sheet 16 of hard tooling 12.

Figure 13:
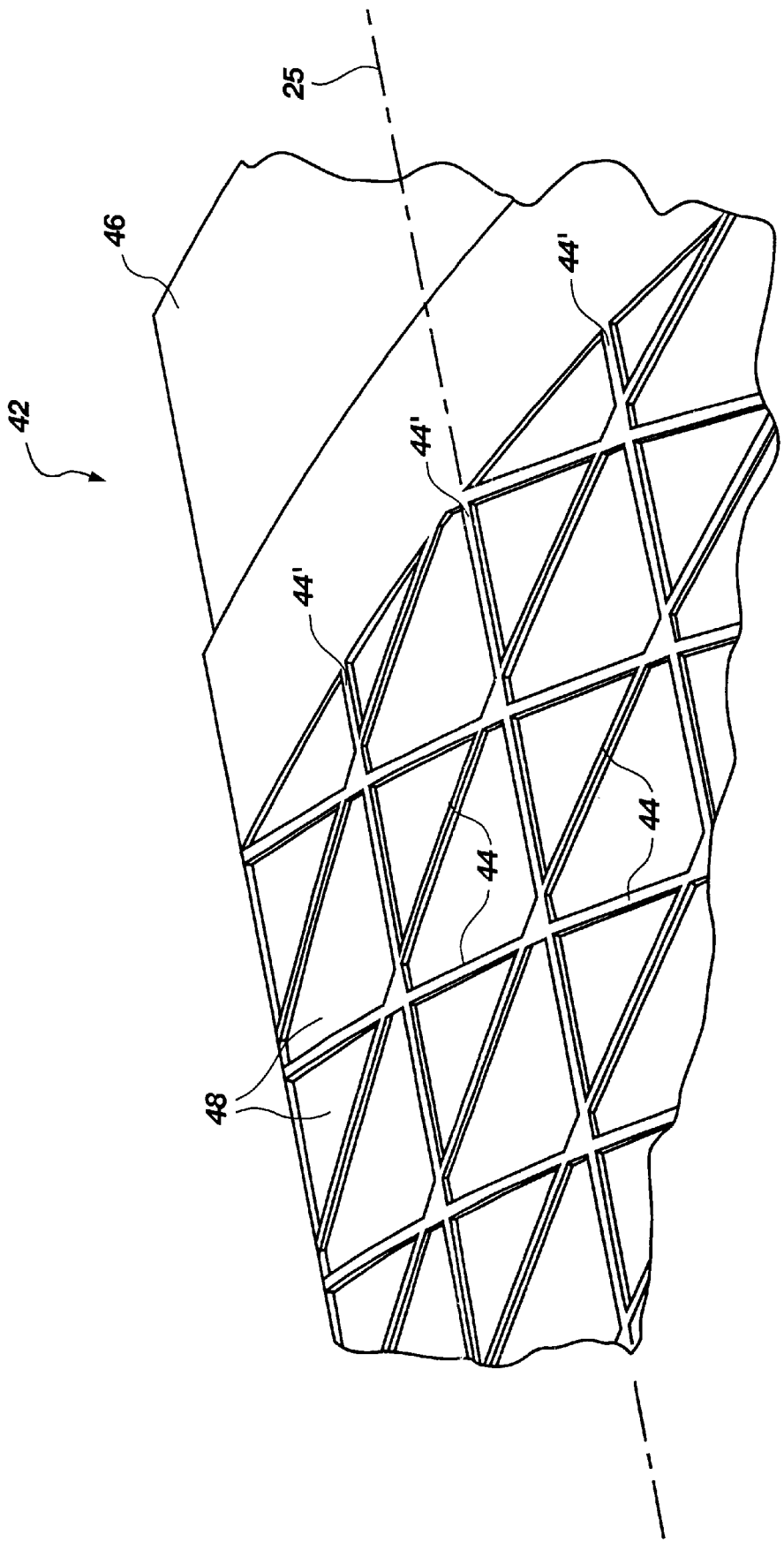
FIG. 13 is a view of a portion of the tooling used in a first embodiment of the present invention to mate with the portion of the tooling illustrated in drawing FIG. 1 of the present invention.

Referring to drawing FIG. 13, a mating piece of tooling 42, also preferred to be hard tooling, is illustrated which mates with hard tooling 12 and consolidation blocks 24 after the formation of a desired composite structure thereon using tows of fiber elements applied to the tooling 12, the mating piece of tooling 42 to be used during the curing of the composite structure. The mating piece of tooling 42 includes a hard tooling sheet 46 having a plurality of recessed pockets 48 therein to receive a portion of a corresponding consolidation block 24 of consolidation medium 14 therein and having a plurality of ribs 44, 44' formed between the recessed pockets 48 located to correspond to the ribs 22, 22' of the sheet 16 of the hard tooling 12 to retain the composite structure therebetween during curing. The ribs 44', like ribs 22' on hard tooling 12, extend parallel to the rotational axis 25 of the mandrel on which hard tooling 12 may be installed. The mating piece of tooling 42 is formed as a mirror image of the hard tooling 12 and consolidation blocks 24. The mating piece of tooling 42 may be formed of any desired material for use in the curing process of the composite structure having sufficient strength during the elevated temperatures of the curing process of the composite structure.

Figure 14:
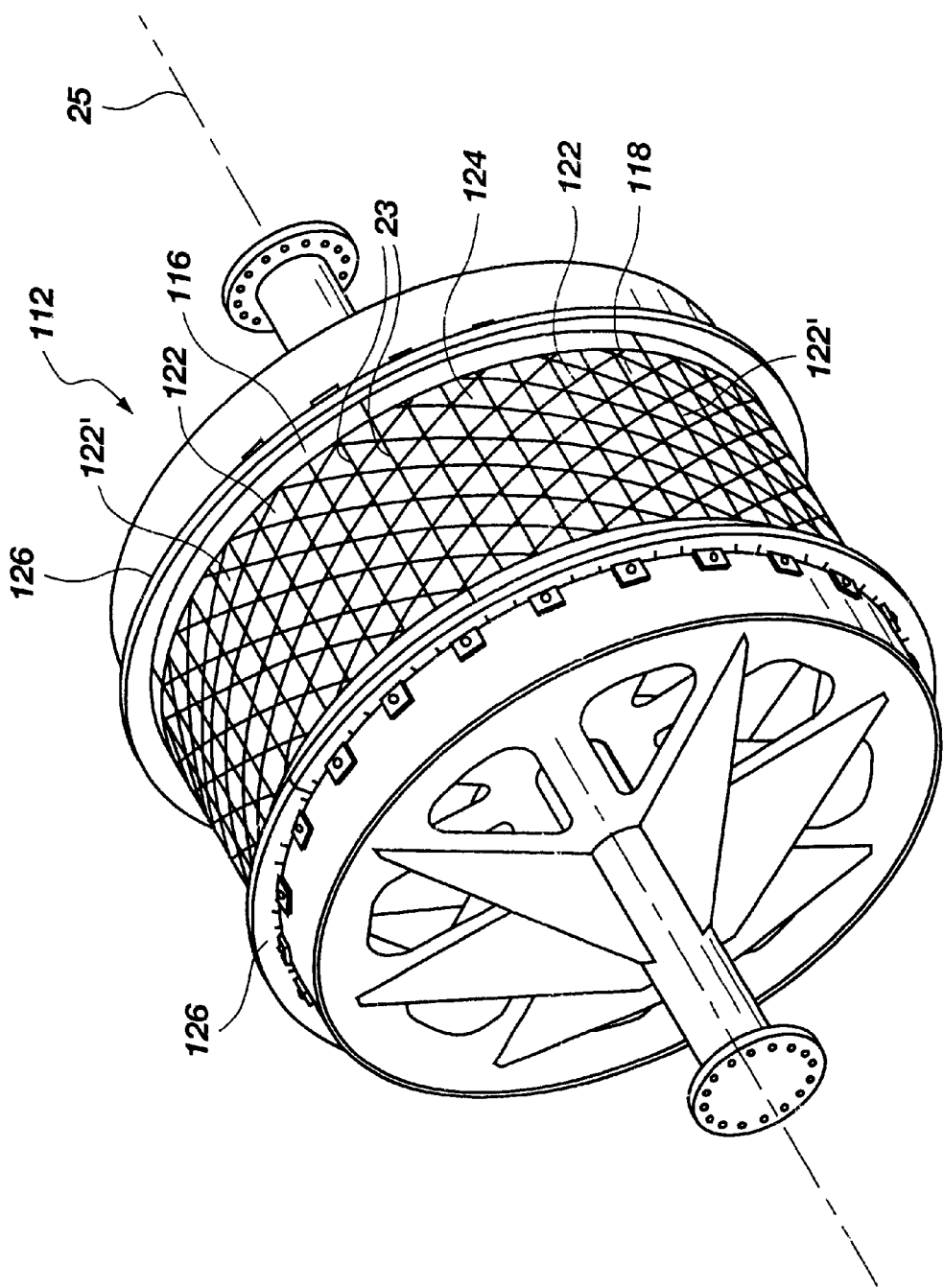
FIG. 14 is a view of a portion of the tooling of the first embodiment of the present invention in a circular drum type configuration.

Referring to drawing FIG. 14, hard tooling 112 in an annular configuration having consolidation blocks 124 thereon is illustrated for forming an annular shaped composite structure thereon. The hard tooling 112 includes a hard sheet 116 of any suitable material having a plurality of consolidation blocks 124 retained thereon with recessed pockets 118 having ribs 122, 122' formed therebetween upon which the composite structure is formed. The hard tooling 112 may be of any suitable, convenient shape for the forming of the annular shaped composite structure thereon for use on any suitable apparatus for the support of the hard tooling 112. The consolidation blocks 124 may be formed as described herein of any desired shape using any suitable, desired connection to the hard tooling 112 to retain the consolidation blocks 124 in the recessed pockets 118 therein. The hard tooling 112 may be formed in segments, any suitable, desired number and shape, which are secured together to form the annular hard tooling 112, the segments allowing the removal of the tooling 112 from the interior of the cured composite structure. The hard tooling 112 may include flanges 126 thereon for use in the formation and curing of the composite structure formed on the hard tooling 112, the hard tooling 112 having a rotational axis 25 for the formation of the composite structure therearound.

Figure 15:
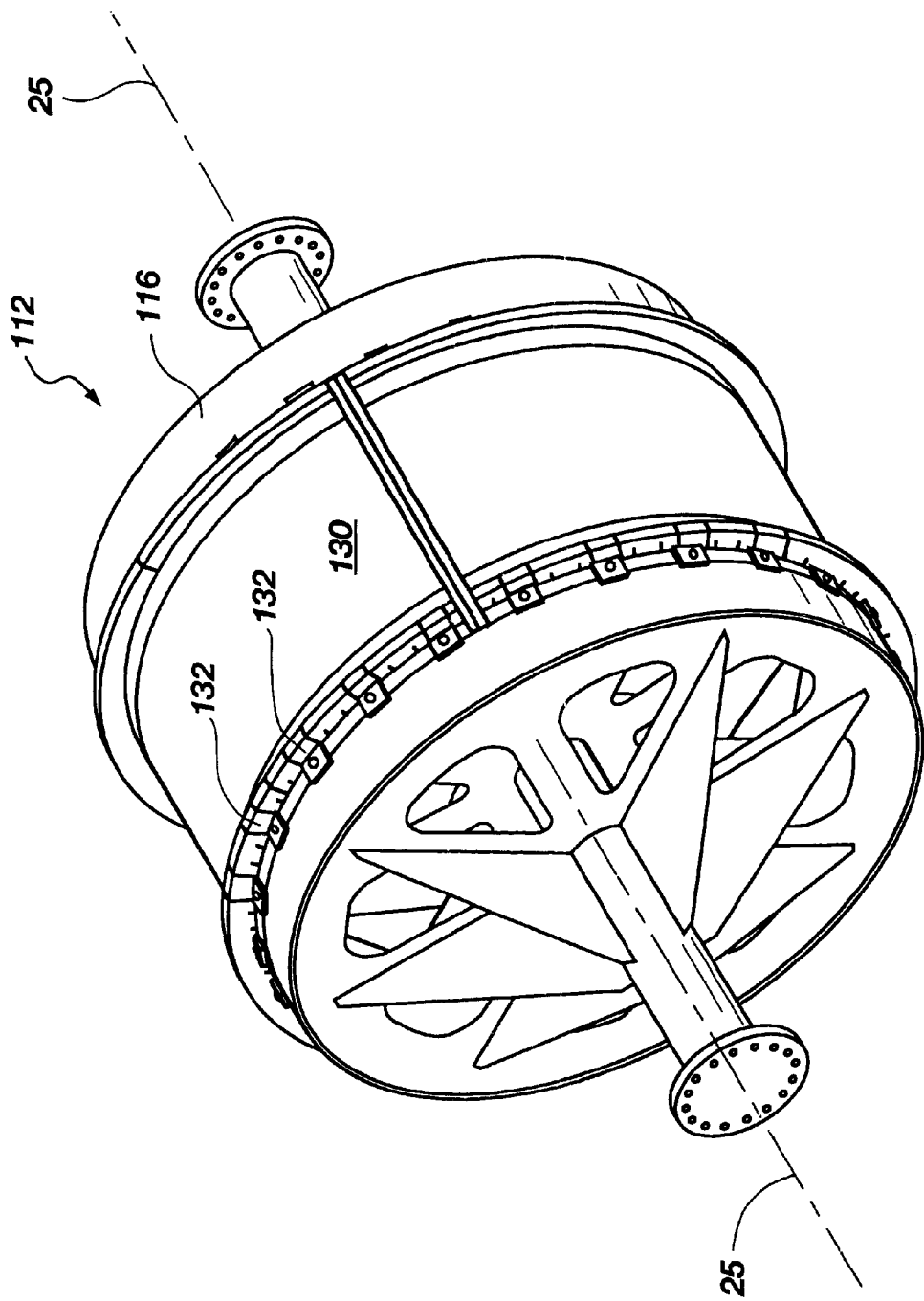
FIG. 15 is a view of a portion of the tooling of the first embodiment of the present invention in a circular drum type configuration with a cover thereon.

Referring to drawing FIG. 15, the hard tooling 112 is illustrated having a cover 130, preferably of hard tooling, installed over the area of the tooling 112 containing the recessed pockets 118 and consolidation blocks 124 (see FIG. 14) for use in the curing of the composite structure formed on the hard tooling 112. The cover 130 may be of any suitable material for use during curing of the composite structure at an elevated temperature, such as aluminum, titanium, steel, etc. The cover 130 and the hard tooling 112 should be lightweight for handling purposes as well as possess sufficient strength for the loading of the composite structure during the curing process. The cover 130 may be secured to the hard tooling 112 by any suitable fastener arrangement, such as the use of clamps and threaded fasteners 132.

Figure 16:
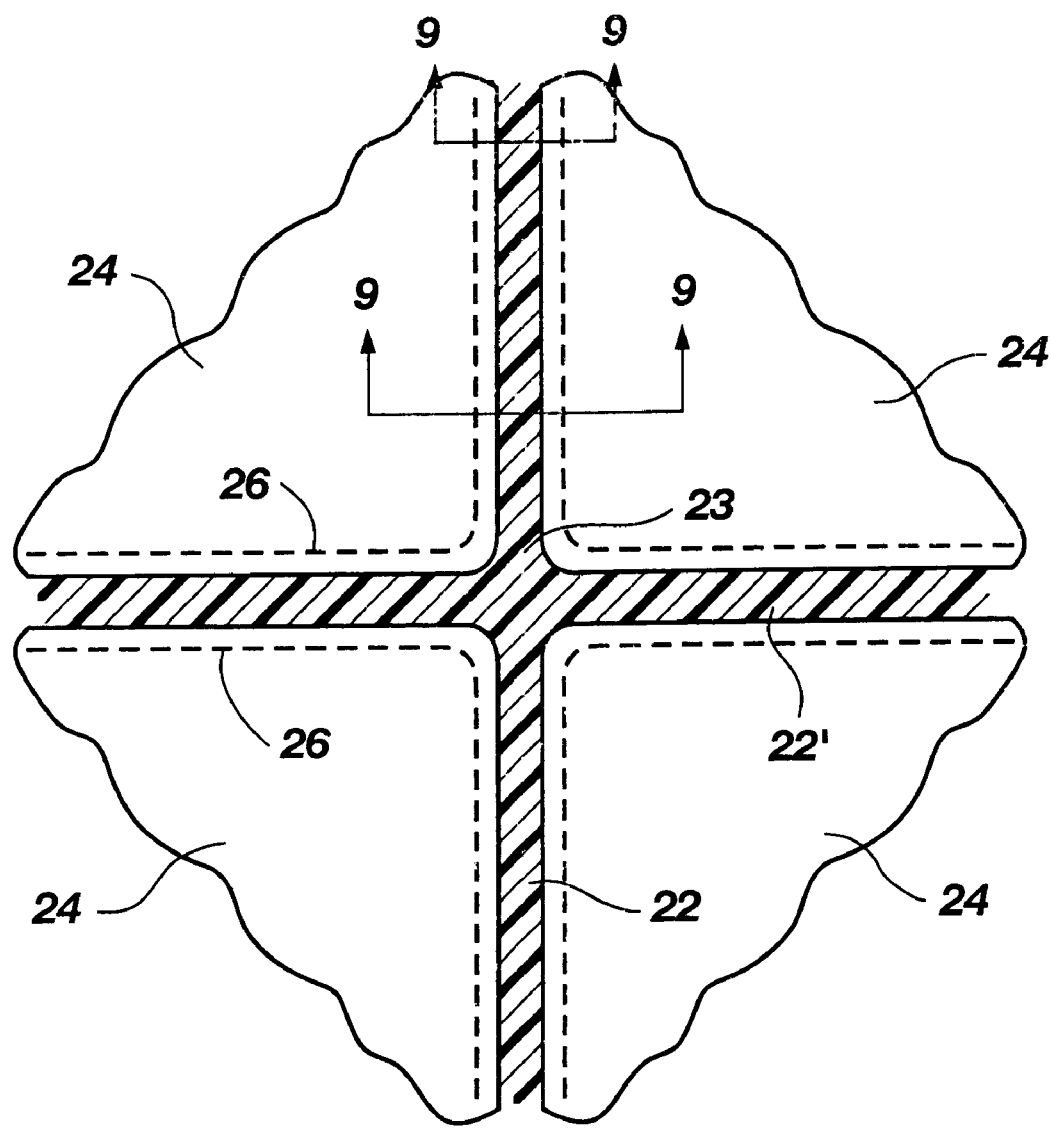
FIG. 16 is a top view of a portion of the tooling used in the present invention with material located thereon.

Referring to drawing FIG. 16, a portion of the hard tooling 12 or 112, without a cover 130 thereover, is illustrated at the juncture of four consolidation blocks 24 or, alternately, 124 (not shown). The consolidation blocks 24 may each include, if desired, a profiled edge thereon to retain the fiber material on the hard tooling 12 or 112 during the formation and curing of the composite structure thereon. The profiled edge 26 may be of any suitable shape, both vertically or longitudinally around a portion or the entire periphery of the consolidation block 24, to retain or contain the fiber material and the coating on the hard tooling 12 or 112.

Figure 17:
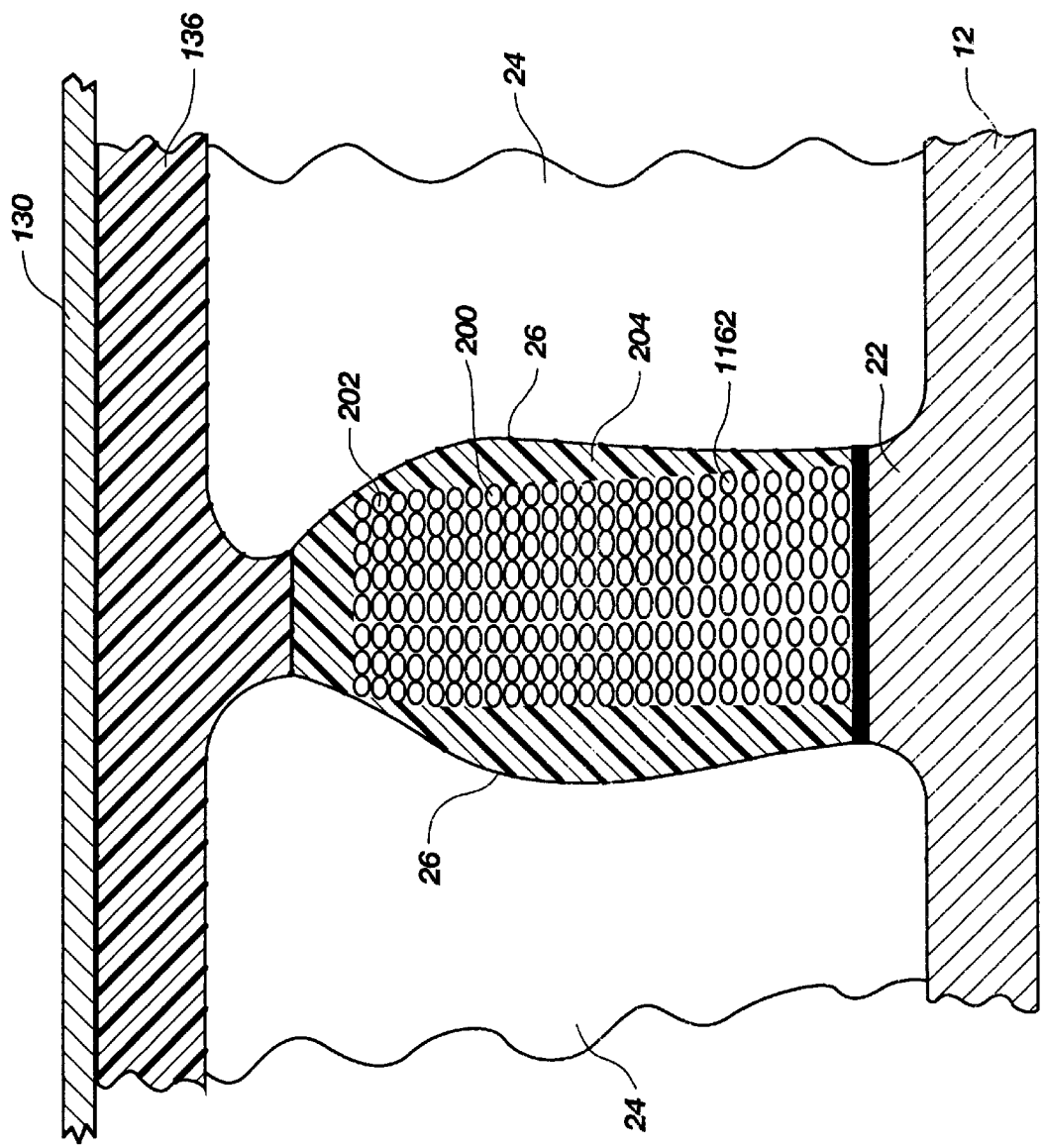
FIG. 17 is a cross-sectional view of a portion of the tooling of the first embodiment of the present invention and a portion of a grid structure formed thereon.

Referring to drawing FIG. 17, a portion of a composite structure formed on hard tooling 12 or 112 (not shown) with consolidation blocks 24 and cover 130 is illustrated as depicted along lines 9—9 of drawing FIG. 16. As illustrated, the consolidation blocks 24 have the edge 26 thereof having a suitable vertical profile adjacent the composite structure being formed on ribs 22 (or rib 22') of the hard tooling 12. The edge 26 may be of any suitable shape and may vary from consolidation block 24 to adjacent consolidation block 24, as illustrated. The purpose of the profiled edge 26 on the consolidation block 24 is to confine and retain the fiber material 200, comprised of tows of fiber elements 1162 hereinbefore described, which includes fibers 202 and coating material 204 thereon, i.e., a carbon fiber impregnated or coated with a curable bonding agent such as filaments of glass, graphite, boron, or polyaramid (Kevlar™), either as individual strands or as multiple strand tows on the ribs 22 of the hard tooling 12, the tows including multiple, parallel, elongated fibers either mutually laterally adhered by the bonding agent or maintained in place by transverse "warp" threads during the lay-up of the fiber material 200 (tows 1162) and the subsequent curing of the fiber material 200 including the fibers 202 and their coating 204 to form a composite structure. The profiled edge 26 on the consolidation block acts to control the placement and movement of the fiber material 200 and its coating, particularly during the curing thereof as the coating flows to assume the shape of the area present between the consolidation blocks 24 and the hard tooling 12. Additionally illustrated is the cover 130 used during curing of the fiber material 200 to form the composite structure and a suitable resilient member 136 located between the cover 130 and the fiber material 200 formed on the ribs 22 of the hard tooling 12. The resilient member 136 is used to confine and load the fiber material 200 during the curing thereof and in the area between the consolidation blocks 24 of the consolidation medium 14 and the ribs 22 of the hard tooling 12. The resilient member 136 may be of any suitable resilient material for use in the curing of the fiber material at elevated temperatures to form the composite structure, such as synthetic rubber, neoprene, etc. Similarly, the resilient member 136 may have any suitable thickness for such use depending upon the composite structure being formed. As illustrated, the coating 204 has been substantially flowed from around the fibers 202 of the fiber material 200 during the curing process to take the shape of the area formed between the consolidation blocks 24, the ribs 22 of the hard tooling 12, and the resilient member 136 backed-up by cover 130. In this manner, the profiled edges 26 of the consolidation blocks 24 act to control the placement of fibers 202 during formation and curing of the composite structure to provide accurate dimensional control of the composite structure formed. In this manner, dimensions may be precisely controlled for the composite structure and, more particularly, repeated to form additional composite structures using the hard tooling 12 and consolidation blocks 24 of the consolidation medium 14. If desired, the resilient member 136 may be used without cover 130 during the curing of the composite structure if the member 136 has sufficient strength for such use without substantial deflection or movement thereof.

Figure 18:
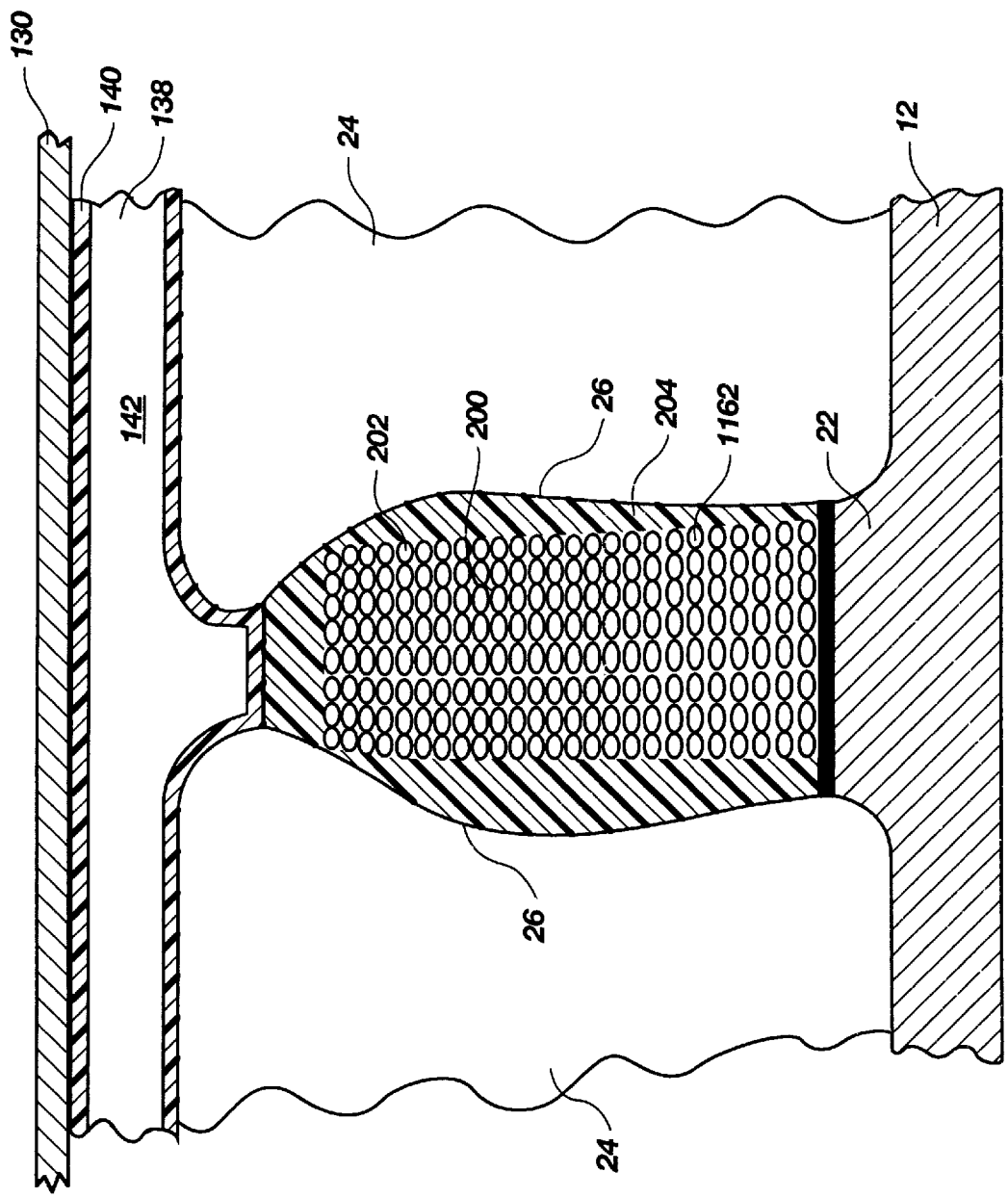
FIG. 18 is a cross-sectional view of a portion of the tooling of a second embodiment of the present invention and a portion of a grid structure formed thereon.

Referring to drawing FIG. 18, an alternative arrangement of a portion of a composite structure formed on hard tooling 12 or 112 (not shown) with consolidation blocks 24 and cover 130 is illustrated as depicted along lines 9—9 of drawing FIG. 16. As illustrated, the consolidation blocks 24 have the edge 26 thereof having a suitable vertical profile adjacent the composite structure being formed on the ribs 22 of the hard tooling 12. The edge 26 may be of any suitable shape and may vary from consolidation block 24 to adjacent consolidation block 24, as illustrated. The purpose of the profiled edge 26 on the consolidation block 24 is to confine and retain the fiber material 200 which includes fibers 202 and coating material 204 thereon, either as individual strands or as multiple strand tows 1162 on the hard tooling 12, during the lay-up of the fiber material 200 and the subsequent curing of the fiber material 200 including the fibers 202 and their coating 204 to form a composite stricture. The profiled edge 26 on the consolidation block acts to control the placement and movement of the fiber material 200 and its coating, particularly during the curing thereof as the coating flows to assume the shape of the area present between the consolidation blocks 24 and the ribs 22 of the hard tooling 12. Additionally illustrated is the cover 130 used during curing of the fiber material 200 to form the composite structure and a suitable resilient member 138 located between the cover 130 and the fiber material 200 formed on the ribs 22 of the hard tooling 12. The resilient member 138 is an inflatable type member having a resilient cover 140 and inflation cavity 142 therein used to confine and load the fiber material 200 during the curing thereof and in the area between the consolidation blocks 24 and the ribs 22 of the hard tooling 12. The resilient member 138 may be of any suitable resilient material for use in the curing of the fiber material at elevated temperatures to form the composite structure, such as synthetic rubber, neoprene, etc., capable of withstanding the inflation pressures used for loading of the fiber material 200 during the curing thereof. If formed to have sufficient strength, a suitable inflatable resilient member 138 may be used without a cover 130. The inflatable member 138 may be inflated using any desired gas, such as air, nitrogen. etc. as desired. The inflation pressure in cavity 142 may be monitored remotely in real time during the curing process, if desired, to insure the proper application of pressure to the fiber material 200 during the curing thereof.

Similarly, the resilient member 138 may have any suitable thickness for such use, depending upon the composite structure being formed. As illustrated, the coating 204 has been substantially flowed from around the fiber 202 of the fiber material 200 during the curing process to take the shape of the area formed between the consolidation blocks 24, the ribs 22 of the hard tooling 12, and the resilient member 138 backed-up by cover 130. In this manner, the profiled edges 26 of the consolidation blocks 24 act to control the fiber 202 placement during formation and curing of the composite structure to provide accurate dimensional control of the composite structure formed. Dimensions may be precisely controlled for the composite structure and, more particularly, repeated to form additional composite structures using the hard tooling 12 and consolidation blocks 24.

Figure 19:
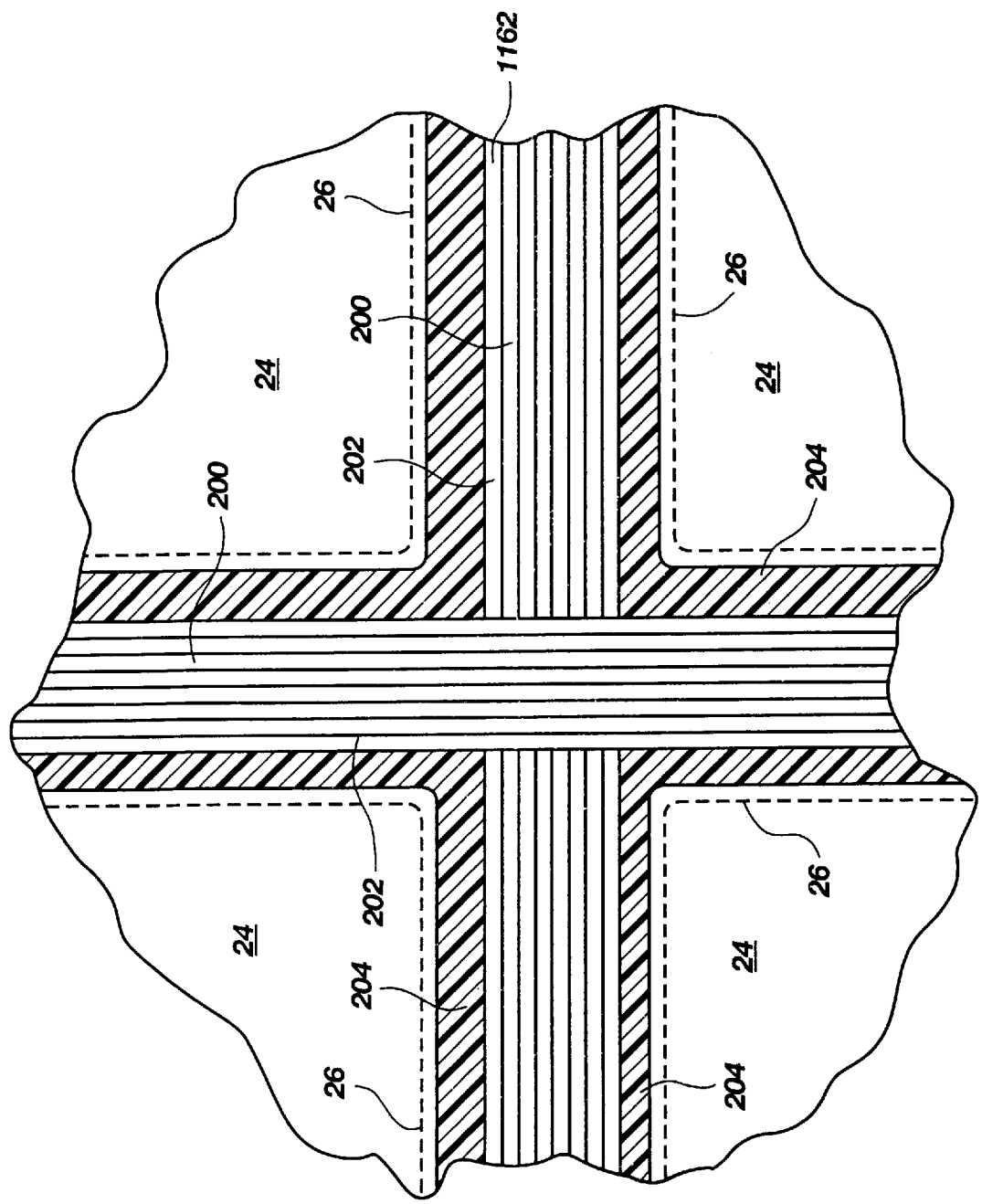
FIG. 19 is a top view of a portion of the tooling of the present invention and a portion of a grid structure formed thereon.

Referring to drawing FIG. 19, illustrated is a view of the cured composite structure formed by the fiber material 200 (of tows 1162) between hard tooling 12 or 112 (not shown) and the consolidation blocks 24. As illustrated, the fibers 200 overlay each other at the intersection thereof with the coating material 204 being retained by and assuming the desired profile shape of the edges 26 of the consolidation blocks 24. In this manner, precise control of the shape and dimensions of the composite structure being formed on the hard tooling 12 or 112 using consolidation blocks 24 is provided on a repeatable basis for forming multiple composite strictures using the same hard tooling 12 or 112 and consolidation blocks 24.

Figure 20:
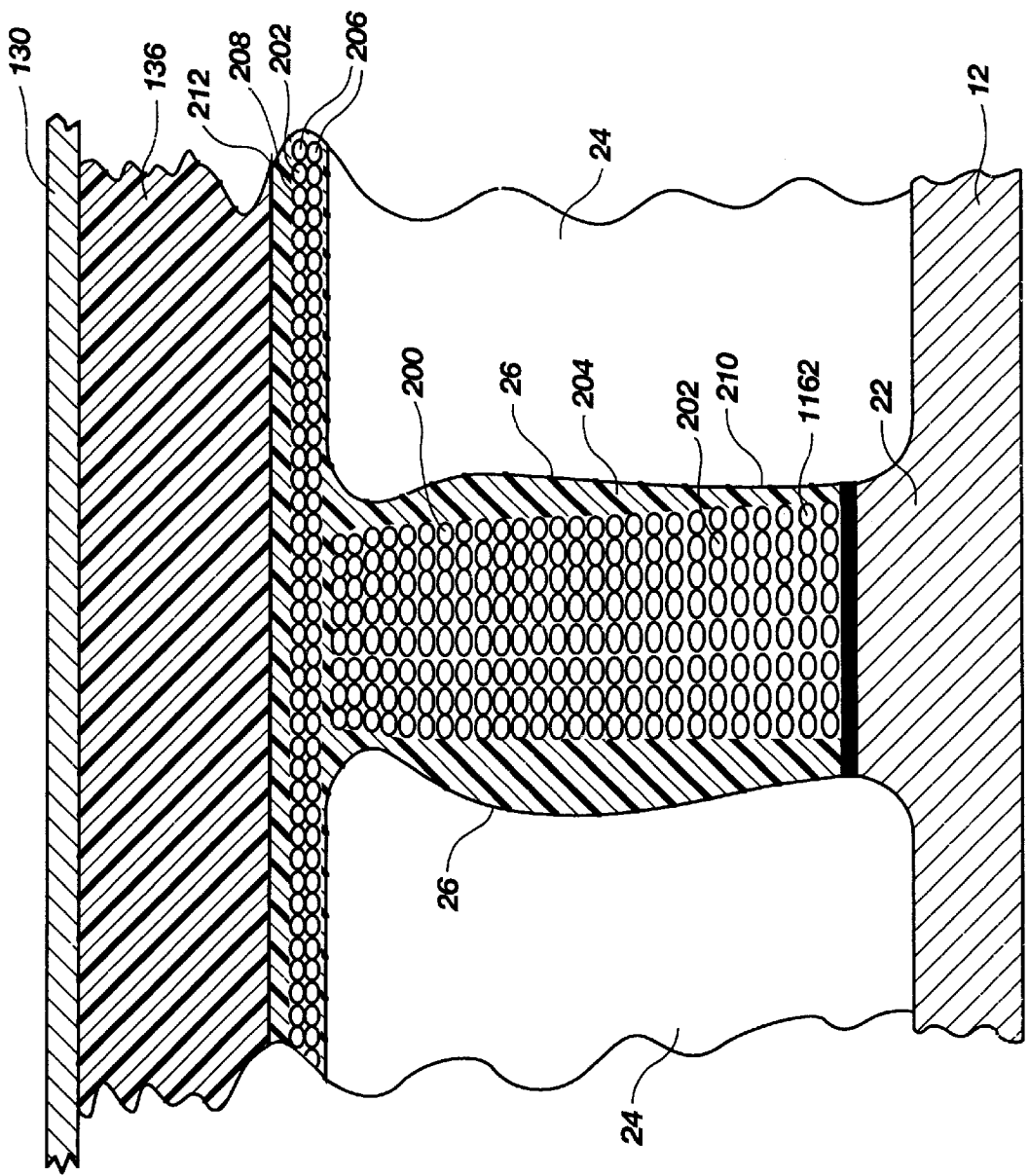
FIG. 20 is a cross-sectional view of a portion of the tooling for a third embodiment of the present invention.

Referring to drawing FIG. 20 a portion of a composite structure formed on hard tooling 12, or 112 (not shown), with consolidation blocks 24 and cover 130 is illustrated. The consolidation blocks 24 have edge 26 having a suitable vertical profile adjacent the composite structure being formed on hard tooling 12. The edge 26 may be of any suitable shape and may vary from consolidation block 24 to adjacent consolidation block 24, as illustrated. The purpose of the profile edge 26 on the consolidation block 24 is to confine and retain the fiber material 200 (tows 1162) which includes fiber 202 and coating material 204 thereon, either as individual strands or as multiple strand tows on the hard tooling 12 during the lay-up of the fiber material 200 and the subsequent curing of the fiber material 200 including the fibers 202 and their coating 204 to form a composite structure. The profiled edge 26 on the consolidation block 24 acts to control the placement and movement of the fiber material 200 and its containing, particularly during the curing thereof, as the coating flows to assume the shape of the area present between the consolidation blocks 24 and the ribs 22 of the hard tooling 12. Additionally illustrated are multiple layers 206 of fibers 202 having a coating 208 thereon which are placed on the exterior of consolidation blocks 24 and the upper extent of the fibers 202 forming the ribs 210 of the composite structure while the layers 206 of fibers 202 form the shell or cover 212 of the composite structure. The layers 206 being placed over the ribs 210 after the formation thereof on the ribs 22 of the hard tooling 12 and over the consolidation blocks 24 on the hard tooling 12. The resilient member 136 may be of any suitable resilient material for use in the curing of the fiber material at elevated temperatures to form the composite structure, such as synthetic rubber, neoprene, etc. Similarly, the resilient member 136 may have any suitable thickness for such use, depending upon the composite structure being formed. As illustrated, the coating 204 on fibers 202 has been substantially flowed from around the fibers 202 of the fiber material 200 during the curing process to lake the shape of the area formed between the consolidation blocks 24, the hard tooling 12, and the resilient member 136 backed-up by cover 130. In this manner, the profiled edges 26 of the consolidation blocks 24 act to control the placement of fibers 202 during formation and curing of the composite structure to provide accurate dimensional control of the composite structure formed. In this manner, dimensions may be precisely controlled for the composite structure and, more particularly, repeated to form additional composite structures using the hard tooling 12 and the consolidation blocks 24 of the consolidation medium 14 in conjunction with the consolidation of the layers 206 forming the shell or cover 212 of the composite structure while ribs 210 are formed between blocks 24. If desired, the resilient member 136 may be used without cover 130 during the curing of the composite structure if the member 136 has sufficient strength for such use without substantial deflection or movement thereof.

Figure 21:
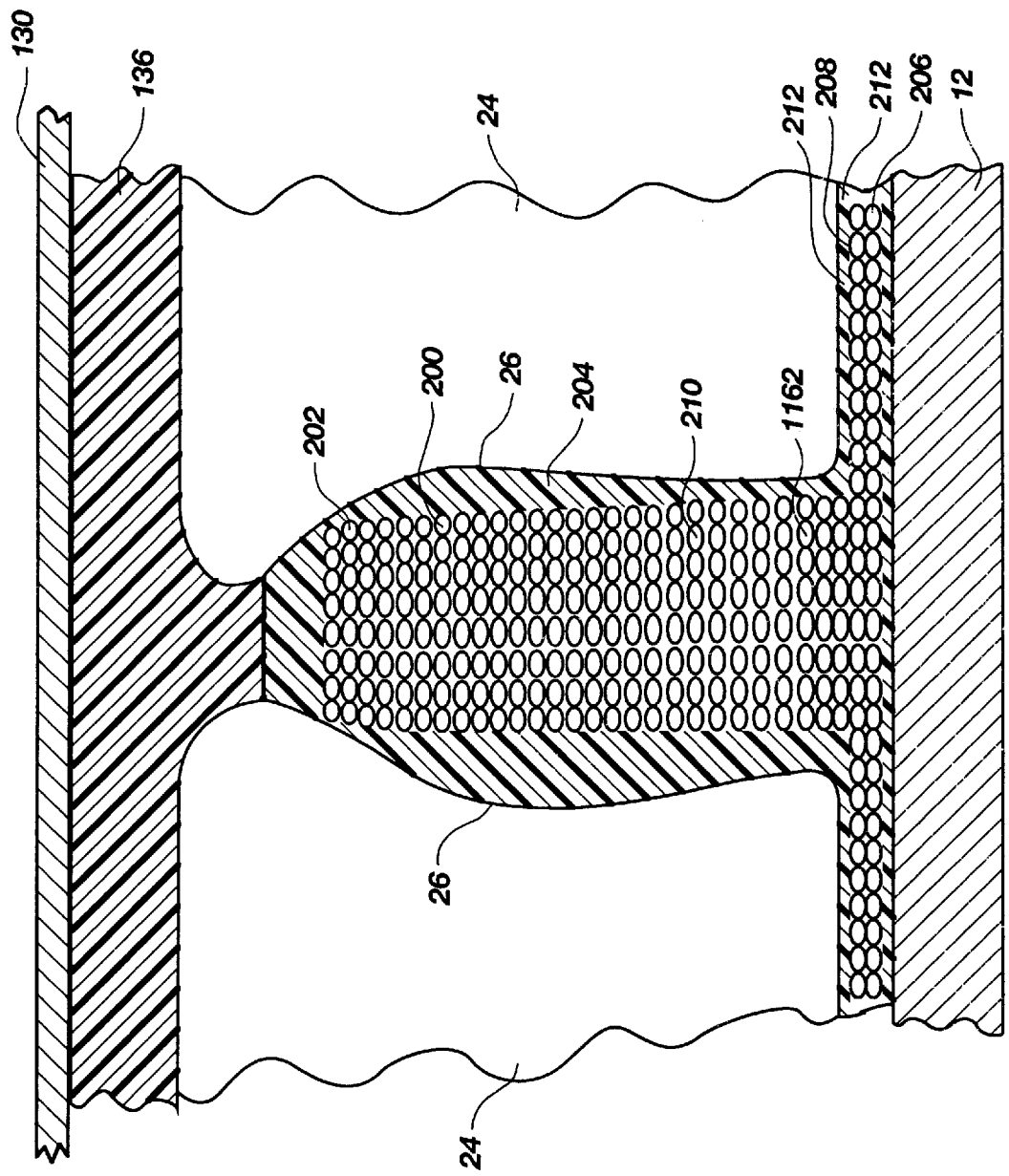
FIG. 21 is a cross-sectional view of a portion of the tooling for a fourth embodiment of the present invention.

Referring to drawing FIG. 21, a portion of a composite structure formed on hard tooling 12, or 112 (not shown), with consolidation blocks 24 of consolidation medium 14 and cover 130 is illustrated. As illustrated, the hard tooling 12 has one or more layers 206 of fiber material 200 thereon prior to the consolidation blocks 24 being placed on the tooling 12. If desired, the layers 206 of fiber material 200 are placed on the hard tooling 12 to form a cover or shell 212 followed by the placement of fiber material 200 thereon to form the ribs 210 on the cover or shell 212. In one instance, the ribs 210 may be formed from individual strands or as multiple strand tows 1162 on the hard tooling 12 prior to the use of the consolidation blocks 24. Alternately, after the consolidation blocks 24 are located on the hard tooling 12 after the application of the layers 206 thereon, the ribs 210 may be formed from individual strands or as multiple strand tows 1162 on the layers 206 on the hard tooling 12 in the area where blocks 24 are or are to be located. As previously described, the consolidation blocks 24 each have a suitable vertical profile adjacent the composite structure being formed between the consolidation blocks 24, the purpose of the profiled edge 26 being to confine, control and retain the fiber material 200 which includes fibers 202 and coating material 204 thereon during the lay-up of the fiber material 200 and the curing of the fiber material 200 to form a composite structure. A cover 130 is used during curing of the fiber material 200 to form the composite structure and a suitable resilient member 136 is located between the cover 130 and the fiber material 200 to confine and load the fiber material 200 during the curing thereof and in between and below the consolidation blocks 24. The resilient member 136 may be of any suitable material and thickness for use in the curing of the fiber material 200. As illustrated, the coating 204 has been substantially flowed from around the fibers 202 of the fiber material 200 during the curing process.

Figure 22:
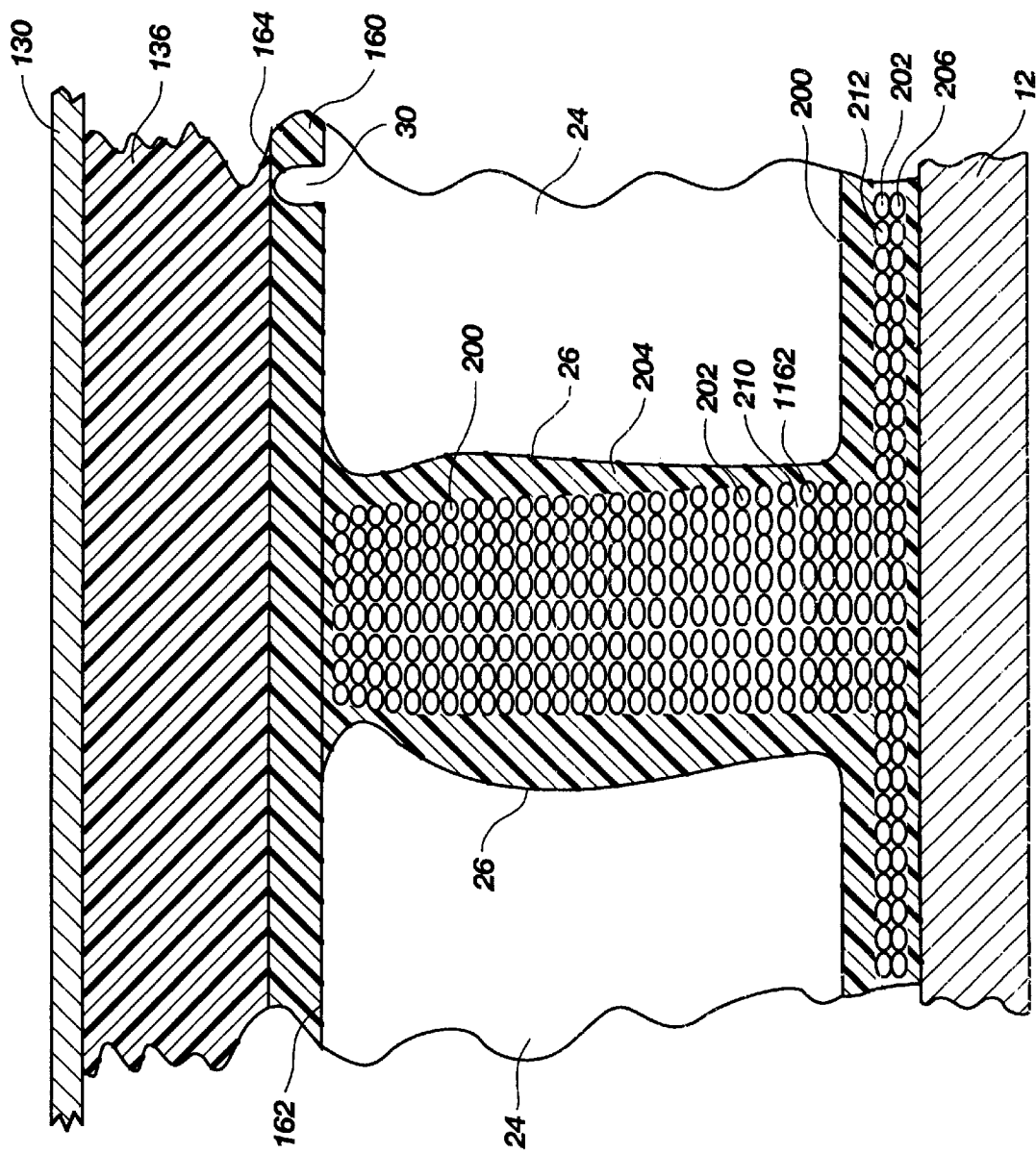
FIG. 22 is a cross-sectional view of a portion of the tooling for a fifth embodiment of the present invention.

Referring to drawing FIG. 22, a portion of a composite structure formed on hard tooling 12, or 112 (not shown), with consolidation blocks 24 of consolidation medium 14 and cover 130 is illustrated. As illustrated, the hard tooling 12 has one or more layers 206 of fiber material 200 thereon to form shell or cover 212 while layers of fiber material 200, tows 1162, are placed thereon to form ribs 210 prior to the consolidation blocks 24 being placed on shell or cover 212 and are placed between ribs 210. The fiber material 200 is placed on the hard tooling 12 to form the cover or shell 212 followed by the placement of the fiber material 200, tows 1162, on the cover or shell 212 to form the ribs 210 of the composite structure. Subsequently, a flexible, resilient sheet 160 having consolidation blocks 24 attached thereto, the consolidation medium, is used to insert or locate the consolidation blocks 24 between ribs 210 prior to the curing of the fiber material 200. The consolidation blocks may be secured by any suitable means to the flexible, resilient sheet 160, such as by an adhesive 162 or by the pin or nub 30 of consolidation block 24 mating with an aperture 164 in the sheet 160. The flexible, resilient member having sufficient flexibility and resiliency to allow positioning of the consolidation blocks 24 into the areas between the ribs 210 formed on the fiber material 200 on the hard tooling 12. The consolidation blocks 24 have a vertical profile 26 thereon adjacent the composite structure, such as a rib 210, being formed between the consolidation blocks 24 to control the fiber material during the curing thereof. A cover 130 is used during the curing of the fiber material 200 to form a composite structure and a suitable resilient member 136 is located between the flexible, resilient sheet 160 retaining consolidation blocks 24 thereon and the cover 130 to confine and load the fiber material 200 during the curing thereof. The resilient member 136 may be of any suitable material and thickness for use in the curing of the fiber material 200. As illustrated, the coating material 204 on the fiber material 200 has been substantially flowed from around the fibers 202 during the curing process.

Figure 23:
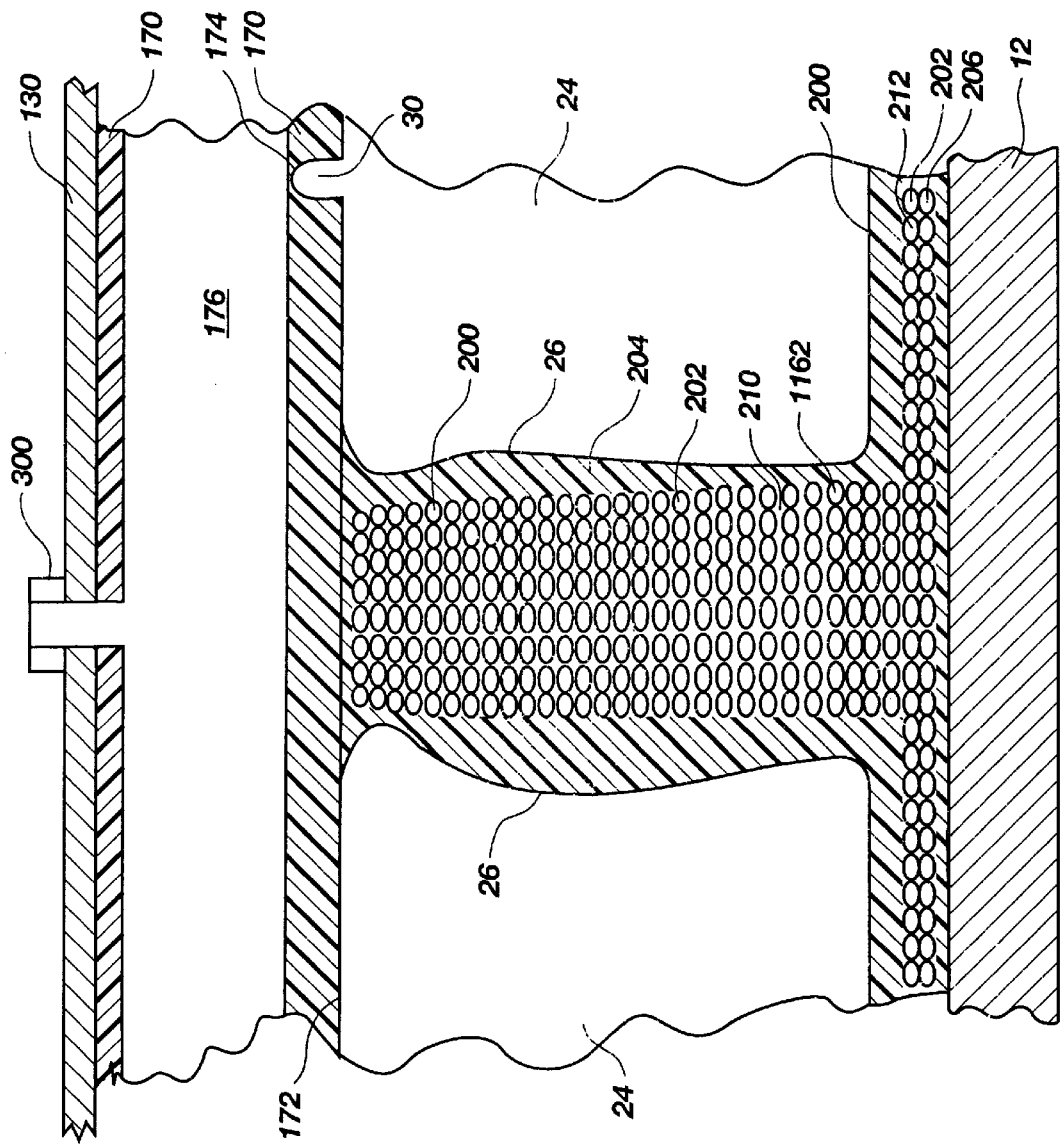
FIG. 23 is a cross-sectional view of a portion of the tooling for a sixth embodiment of the present invention.

Referring to drawing FIG. 23, a portion of a composite structure on hard tooling 12, or 112 (not shown), with consolidation blocks 24 of consolidation medium 14 and cover 130 is illustrated. As illustrated, the hard tooling 12 has one or more layers 206 of fiber material 200 thereon to form shell or cover 212 while layers of fiber material 200, tows 1162, are placed thereon to form ribs 210 prior to the consolidation blocks 24 being placed on the hard tooling 12 to form the cover or shell 212 and are placed between ribs 210. Subsequently, a flexible, resilient sheet or member 170 having chamber 176 and apertures 174 therein and having consolidation blocks 24 attached thereto, the consolidation medium, is used to insert or locate the consolidation blocks 24 between the ribs 210 prior to the curing of the fiber material 200. The consolidation blocks 24 may be secured by any suitable means to the flexible, resilient sheet 170, such as by adhesive 172 or the pin or nut 30 of consolidation block 24 mating with an aperture 174 in the sheet 170. The member 170 has chamber 176 therein connected to aperture 300 in cover 130 to allow for the application of fluid pressure to the member 170 either to help facilitate the insertion of the consolidation blocks 24 between the ribs 210 or for the application of pressure during the curing process of the fiber material 200, or both. Any suitable fluid may be used in the cavity 176, such as compressed air, inert gas, etc. The flexible, resilient member 170 has sufficient flexibility and resiliency to allow positioning of the consolidation blocks 24 into the areas between the ribs 210 formed on the fiber material 200 forming the shell or cover 210 on the hard tooling 12. The consolidation blocks 24 having a vertical profile 26 adjacent the composite structure, such as a rib 210, being formed between the consolidation blocks 24 to control the fiber material during the curing thereof. A cover 130 is used in addition to the member 170 during the curing of the fiber material 200 to form a composite structure. The resilient member 170 may be of any suitable material and thickness to confine and load the fiber material 200 during the curing thereof. As illustrated, the coating material 204 on the fiber material 200 has been substantially flowed from around the fibers 202 during the curing process.

Figure 24:
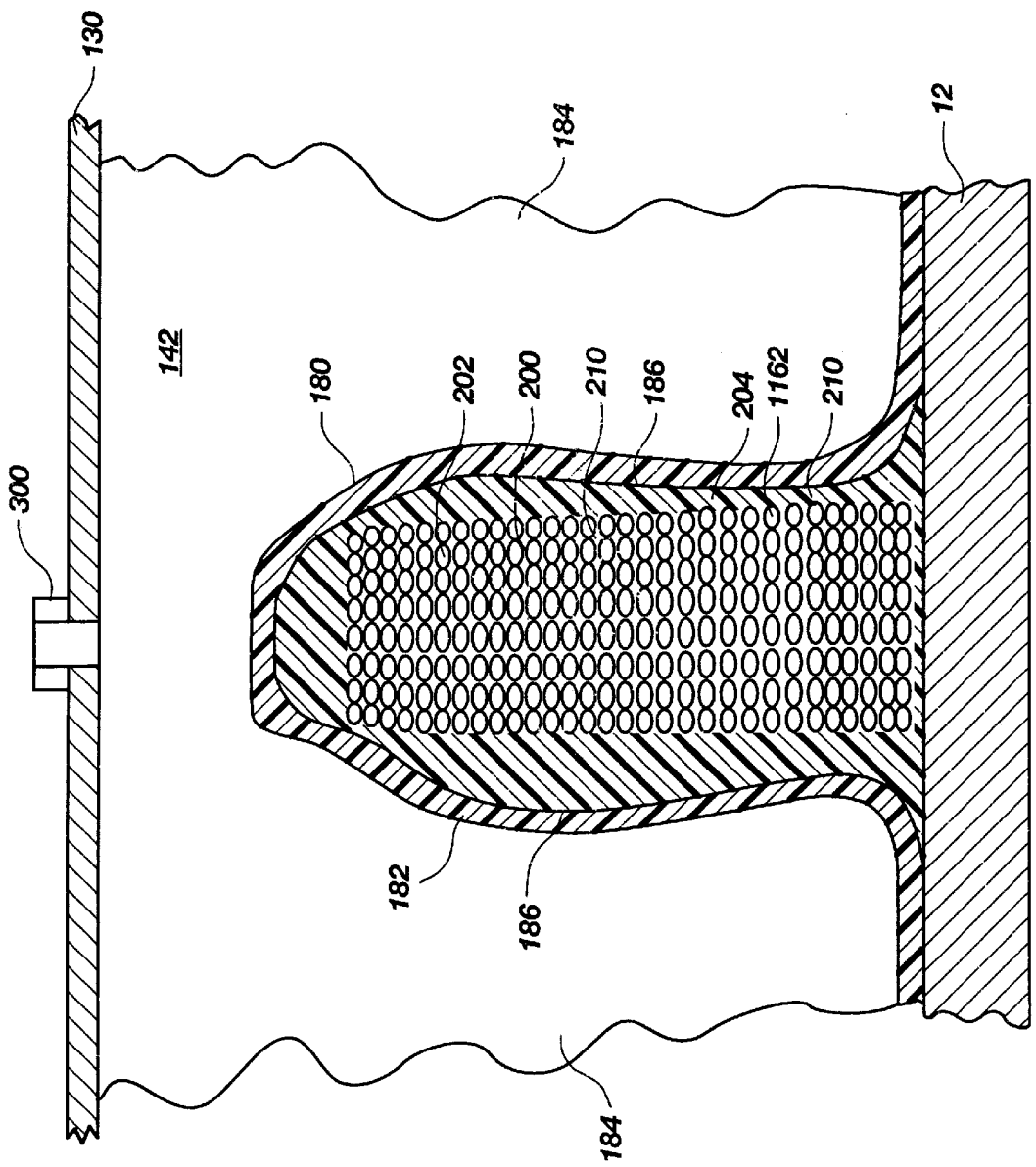
FIG. 24 is a cross-sectional view of a portion of the tooling for a seventh embodiment of the present invention.

Referring to drawing FIG. 24, a portion of a composite structure formed on hard tooling 12 or 112 (not shown) with flexible, resilient mold member 180 of the consolidation medium 14 is illustrated. As illustrated, a rib 210 is formed of tows 1162 on hard tooling 12 of fiber material 200 of fibers 202 having coating 204 thereon. The member 180, the consolidation medium, is formed of flexible, resilient material having a predetermined configuration or shape desired for the curing of the fiber material 200 located on hard tooling 12. The member 180 may be of any suitable material for use in the curing of the fiber material 200, such material having sufficient strength to retain its shape during the curing process and confine the fiber material 200 forming a rib 210 or the like of the composite structure during curing as well as sufficient resiliency to allow the insertion of the member 180 into the areas between ribs 210 formed on the hard tooling 12. The member 180 may be a silicon elastomeric material, rubber, synthetic rubber, neoprene, etc. reinforced with a suitable fabric material, such as nylon, Kevlar™, metal, etc. The member 180 may be formed into the desired shape, such as by compression molding. The member 180 may have the portions 182 having profile 186 thereon used to confine the fiber material 200 forming the ribs 210 of the composite structure having any desired profile either vertically or cross-sectionally, as desired, to yield the desired rib structure 210 after curing. The member 180 is applied or installed on the hard tooling 12 after the application of the fiber material 200 to form the uncured rib 210 on the hard tooling 12. The member 180 is applied to the hard tooling over the ribs 210 of fiber material 200 formed thereon with the portions 182 of the member 180 applied over the ribs 210 and with the remaining portions of the member 180 abutting the hard tooling 12. During the curing process of the fiber material 200, the member 180 is loaded to compress the fiber material 200 by the application of a suitable amount of pressure, such as compressed air or an inert gas, through aperture 300 in cover 130 into the area 142 between the cover 130 and member 180 to compress the member 180 about the rib 210 during curing and against hard tooling 12 to control the shape of the rib 210 during curing and the flow of coating material 204 on the fibers 202 during the curing process with the profile 186 on the portion 182 providing the cross-sectional shape control of the rib 210. As previously described, the fiber material 200 may be applied as individual strands or as tows 1162 of strands to form the rib 210 on the hard tooling 12. As illustrated, the profile 186 of portion 182 of the member 180 forms a rib 210 during curing having a cross-sectional shape similar to that when consolidation blocks 24 are used during the curing process.

Figure 25:
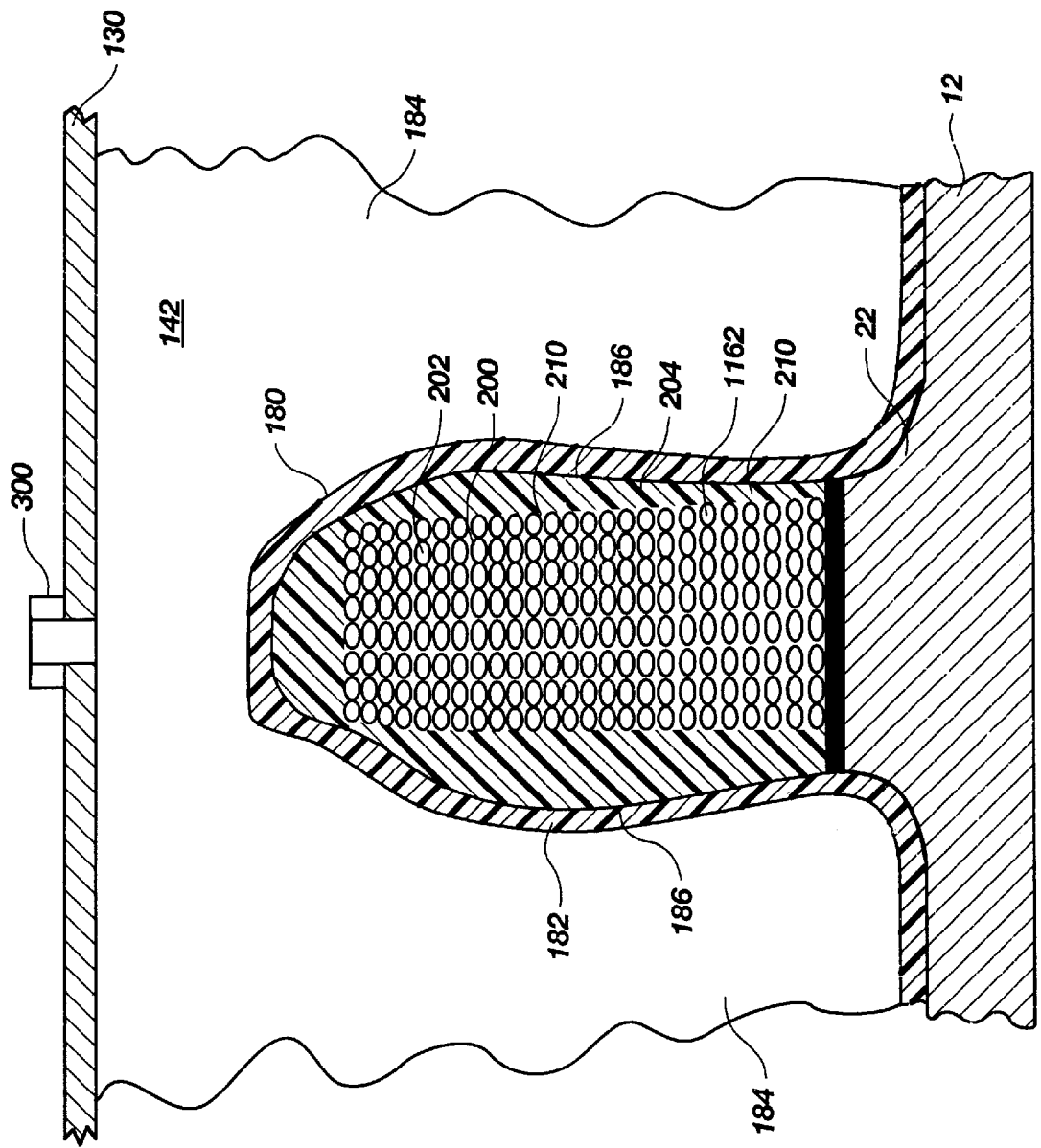
FIG. 25 is a cross-sectional view of a portion of the tooling for an eighth embodiment of the present invention.

Referring to drawing FIG. 25, a portion of a composite structure formed on hard tooling 12 or 112 (not shown) with flexible, resilient mold member 180 of the consolidation medium 14 is illustrated. As illustrated, a rib 210 is formed on rib 22 of hard tooling 12 being formed of tows 1162 on hard tooling 12 of fiber material 200 of fibers 202 having coating 204 thereon. The member 180, the consolidation medium, is formed of flexible, resilient material having a predetermined configuration or shape desired for the curing of the fiber material 200 located on the ribs 22 of the hard tooling 12. The member 180 may be of any suitable material for use in the curing of the fiber material 200, such material having sufficient strength to retain its shape during the curing process and confine the fiber material 200 forming a rib 210 or the like of the composite structure during curing as well as sufficient resiliency to allow the insertion of the member 180 into the areas between ribs 210 formed on the hard tooling 12. The member 180 may be a silicon elastomeric material, rubber, synthetic rubber, neoprene, etc. reinforced with a suitable fabric material, such as nylon, Kevlar™, metal, etc. The member 180 may be formed into the desired shape, such as by compression molding. The member 180 may have the portions 182 having profile 186 thereon used to confine the fiber material 200 forming the ribs 210 of the composite structure having any desired profile either vertically or cross-sectionally, as desired, to yield the desired rib structure 210 after curing. The member 180 is applied or installed on the hard tooling 12 after the application of the fiber material 200 to form the uncured rib 210 on the hard tooling 12. The member 180 is applied to the hard tooling 12 over the ribs 210 of fiber material 200 formed thereon with the portions 182 of the member 180 applied over the ribs 210 and with the remaining portions of the member 180 abutting the hard tooling 12. During the curing process of the fiber material 200, the member 180 is loaded to compress the fiber material 200 by the application of a suitable amount of pressure, such as compressed air or an inert gas, through aperture 300 in cover 130 into the area 142 between the cover 130 and member 180 to compress the member 180 about the rib 210 during curing and against hard tooling 12 to control the shape of the rib 210 during curing and the flow of coating material 204 on the fibers 202 during the curing process with the profile 186 on the portion 182 providing the cross-sectional shape control of the rib 210. As previously described, the fiber material 200 may be applied as individual strands or as tows 1162 of strands to form the rib 210 on the hard tooling 12. As illustrated, the profile 186 of portion 182 of the member 180 forms a rib 210 during curing having a cross-sectional shape similar to that when consolidation blocks 24 are used during the curing process.

Figure 26:
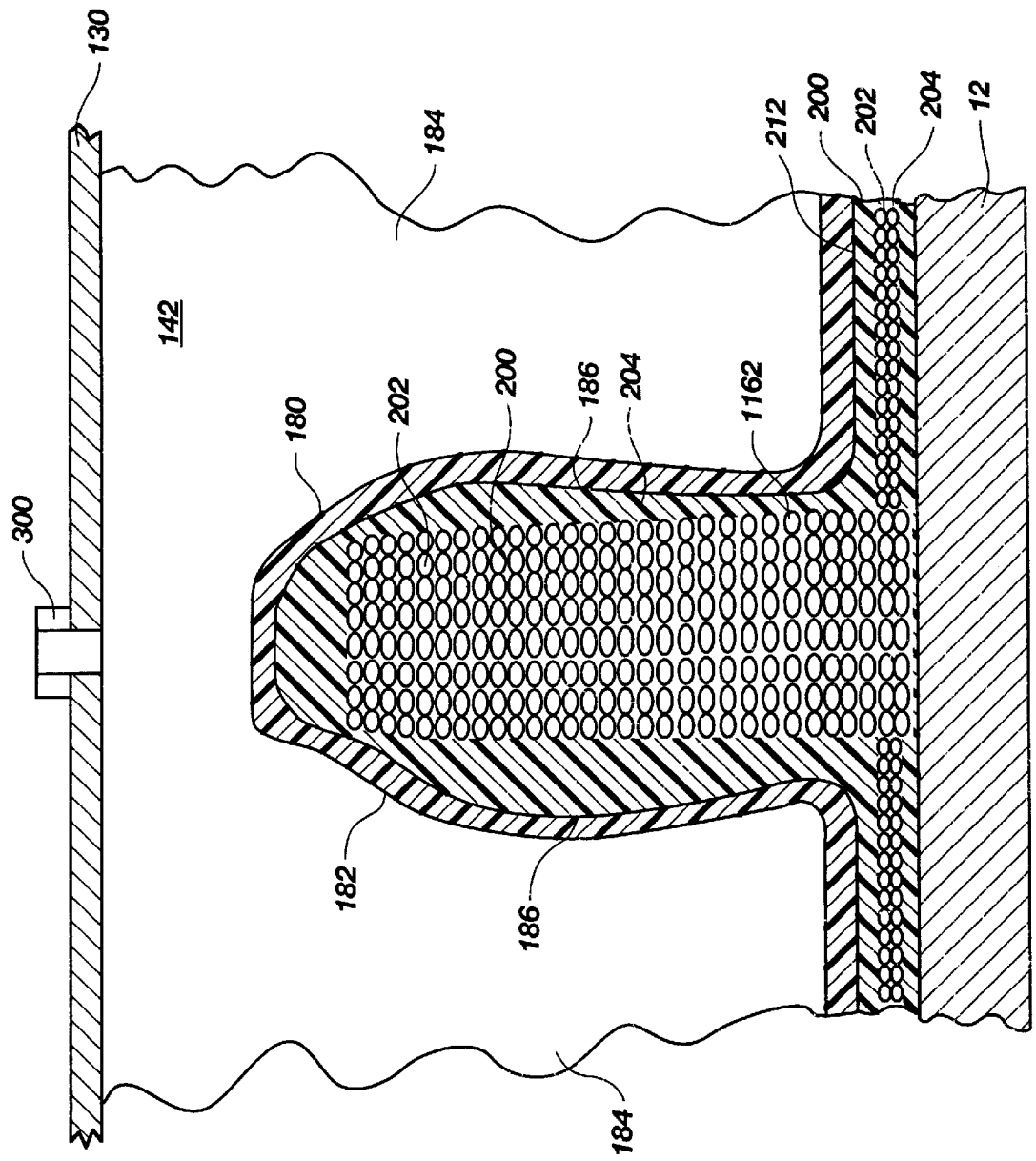
FIG. 26 is a cross-sectional view of a portion of the tooling for a ninth embodiment of the present invention.

Referring to drawing FIG. 26, a portion of a composite structure formed on hard tooling 12, or 112 (not shown), with flexible, resilient mold member 180 of the consolidation medium 14 is illustrated. As illustrated, a cover or shell 212 of fiber material 200 is formed on hard tooling 12 prior to the rib 210 of fiber material 200, tows 1162, being formed on the hard tooling 12. After the cover or shell 212 and rib 210 of fiber material 200 is formed, the flexible, resilient member 180 having portion 182 having profile 186 is installed over ribs 210 and cover or shell 212 prior to the curing of the fiber material 200. The member 180, the consolidation medium, is loaded by suitable pressure, such as air pressure or inert fluid pressure, through aperture 300 in cover 130 into the area 142 between the cover 130 and member 180 to compress the member 180 about the rib 210 and against cover or shell 212 during curing and against hard tooling 12 to control the shape of the cover 212 and rib 210 of the composite structure. As previously described, the fiber material 200 may be applied in sheets for cover or shell 212 and applied as individual strands or tows of strands to form the rib 210 on hard tooling 12.

Figure 27:
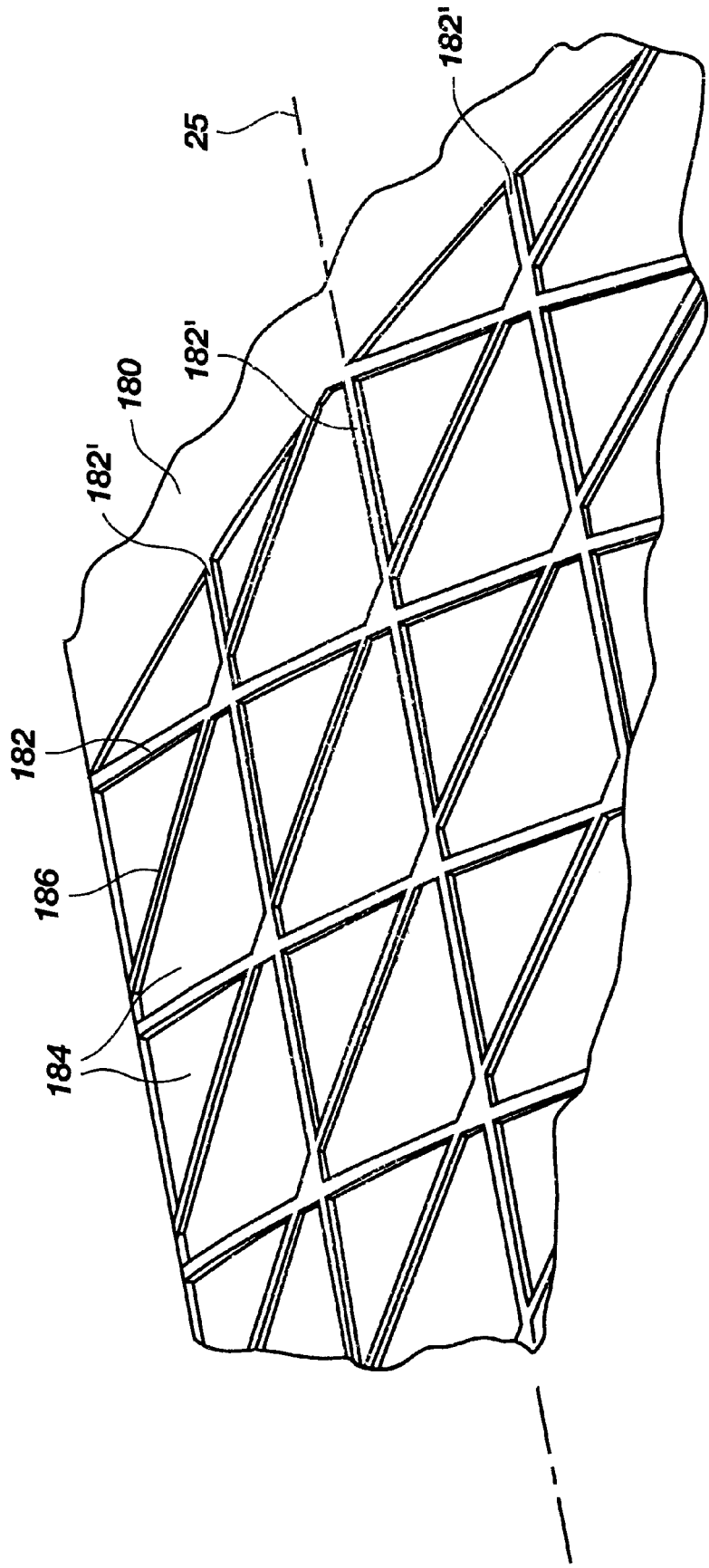
FIG. 27 is a top view of a portion of the tooling used for the eighth and ninth embodiments of the present invention.

Referring to drawing FIG. 27, a portion of the flexible, resilient member 180 of the consolidation medium 14 is illustrated. The member 180 includes portions 182 having profiles 182, 182' (182' being located parallel the rotational axis 25 of hard tooling 12/112) thereon which cover ribs 210 during the curing process and recessed portions 182, having side wall 186 as a portion thereon, which extend between the ribs 210, the portions 182 contacting hard tooling 12 or fiber material 200, tows 1162, on the hard tooling 12 during the curing process of the fiber material 201). The member 180 may be formed in a substantially flat sheet or any desired shape, such as cylindrical, annular, conical, etc.

Figure 28:
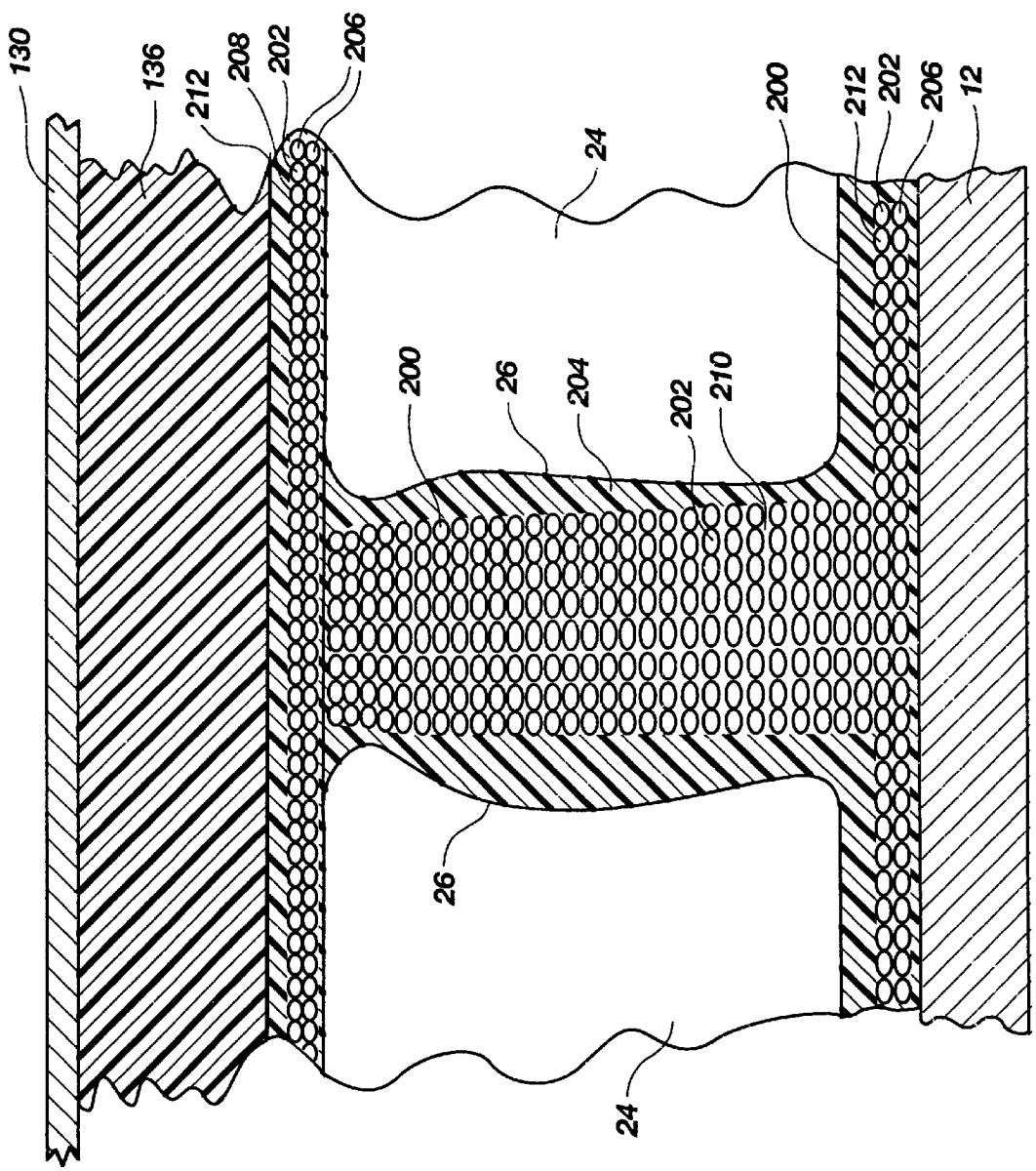
FIG. 28 is a cross-sectional view of a portion of the tooling for a ninth embodiment of the present invention.

Referring to drawing FIG. 28, a portion of a composite structure formed on hard tooling 12, or 112 (not shown), with consolidation blocks 24 of the consolidation medium 14 and cover 130 is illustrated. The consolidation blocks 24 have edge 26 having a suitable profile adjacent the composite structure being formed therebetween on hard tooling 12. The edge 26 may be of any suitable shape and may vary from consolidation block 24 to adjacent consolidation block 24, as illustrated. The purpose of the profile edge 26 on the consolidation block 24 is to confine and retain the fiber material 200, tows 1162, which includes fiber 202 and coating material 204 thereon, either as individual strands or as multiple strand tows on the hard tooling 12 during the lay-up or curing or both of the fiber material 200, tows 1162, to form the composite structure. Additionally illustrated are multiple layers 206 of fibers 202 having coating 208 thereon which are placed, initially, on the hard tooling 12 to form an inner shell or cover 212 before the layers 202 forming ribs 210 thereover and, subsequently having multiple layers 206 formed on the ribs 210 after the formation thereof to form an outer cover or shell 212. The consolidation blocks 24 may be placed on layer 206 before the formation of the ribs 210 or placed in between the ribs 210 after their formation on layers 206 on hard tooling 12 but before the curing of the fiber material. The consolidation blocks 24 remain in the cured composite structure to provide rigidity and strength thereto as well as control the curing of the covers or shells 212 as well as the ribs 210 during the curing of the fiber material 200. The resilient member 136 may be of any suitable resilient material for use in the curing of the fiber material at elevated temperatures to form the composite structure, such as synthetic rubber, neoprene, etc. As illustrated, the coating 204 on fibers 202 has been substantially flowed around the fibers 202 of fiber material 200 during the curing process to take the shape of the area formed between the consolidation blocks 24, the hard tooling 12, and the resilient member 136 backed-up by cover 130. In this manner, the profiled edges 26 of the consolidation blocks act to control the placement and/or movement of fibers during formation and curing of the composite structure to provide accurate dimensional control of the composite structure.

Referring to drawing FIGS. 1 through 28, to form the desired composite structure, the hard tooling 12 or 112 is formed having the desired recessed pockets 18 or 118 formed therein, apertures 20 formed therein, and ribs 22 or 122 formed between recessed pockets 18 or 118. The desired shape consolidation blocks 24 of the consolidation medium 14 having the desired profiled edges 26 thereon are formed to mate with the corresponding recessed pockets 18 or 118 of the hard tooling 12 or 112 to form the desired composite structure. The consolidation blocks 24 may be retained within apertures 20 by any suitable apparatus as described herein. A mating piece of tooling 42 is formed with recessed pocket 48 therein and ribs 44 thereon to mate with the consolidation blocks 24 and hard tooling 12. Alternately a cover 130 is formed to mate with hard tooling 112 as well as a resilient member 136 or 138 If the consolidation blocks 24 are not used during curing of the fiber material, the flexible, resilient member 170 or 180 or a flexible, resilient sheet 160 having consolidation blocks 24 thereon may be used to consolidate the fiber material.

After the hard tooling 12 or 112 has been assembled having the desired consolidation blocks 24 thereon, fiber material 200 is placed or applied in the area formed between the ribs 22 or 122 on hard tooling 12 or 112, respectively, and the adjacent consolidation blocks 24 to form the composite stricture. The fiber material may be placed in such areas using suitable equipment and apparatus and methods known in the industry as desired by placing individual, coated fibers or multi-strand fiber tows of fiber material 200 either continuously or in discreet length segments.

After the desired amount of fiber material 200 has been applied to the hard tooling 12 or 112 between the consolidation blocks 24, the hard tooling 12 and the consolidation blocks 24 are covered with tooling 42. Alternately, the fiber material 200 forming ribs 210 or ribs 210 and cover or shell 212 is covered with a resilient material 136 or 138 and, if desired, a cover 130 for the curing of the fiber material 200 at elevated temperatures to form the composite structure. After curing of the fiber material 200 to form the composite structure, the cover 130 and resilient member 136 or 138 is removed from the hard tooling 12 or 112 and consolidation blocks 24. If necessary because of the shape of the profiled edge 26 on the consolidation blocks 24, the blocks 24 may be removed next, leaving the composite structure on the hard tooling 12 or 112 for subsequent removal therefrom. If the composite structure is in annular form, such as illustrated in drawing FIGS. 7 and 8, the cover 130 is removed and the hard tooling 112 is removed from the interior of the annular composite structure by disassembling the hard tooling for removal from the structure. Alternately, the cover or shell 212 is formed on hard tooling 12 or 112 from fiber material in sheet form with the ribs 210 being formed thereon from fiber material 200. The fiber material 200 is cured using flexible, resilient member 160 or 180 to control the fiber material during curing.

The use of the present invention of hard tooling 12 or 112, the consolidation blocks 24, resilient member 136 or 138, the flexible, resilient member 160, 170, 180, and if desired, cover 130 allows the repeated manufacture of desired composite structures having the desired dimensions thereof, thereby producing a composite structure with minimal variations therein.

The hard tooling 12 or 112 in conjunction with the consolidation blocks 24, which are retained precisely within recessed pockets 18 or 188 of the hard tooling 12 or 112 or on the flexible, resilient member 160 or 170 or the flexible, resilient member 180 molded to the desired composite structure shape, respectively, provides for precise dimensional control of the composite structure being formed with minimal variations therein. The hard tooling 12 or 112, consolidation blocks 24, flexible, resilient member 160, and flexible, resilient member 170 or 180 may be formed in any desired configuration to form any desired composite structure having any desired shape, such as flat, annular, cylindrical, etc.

Those skilled in the art will recognize changes, additions, and deletions to and variations of the hard tooling, consolidation blocks, resilient members, and covers illustrated herein that are within the scope and the teachings of the invention. Such are covered within the scope of the claimed invention.

We claim:

1. Apparatus for the formation of a composite structure of fiber elements on a work surface, said apparatus comprising:
    fiber element apparatus, said fiber element apparatus including:
        a base mount securable to a structure for supporting the fiber element apparatus; and
        a frame member secured and selectively movable with respect to the base mount, and having mounted thereon:
            a spool holder;
            a first roller and a second roller for guiding a fiber element received from a spool carried by the spool holder;
            a guide assembly for receiving the fiber element from the second roller and having associated therewith a drive assembly for selectively moving the fiber element and a knife assembly for selectively cutting the fiber element after movement thereof through the drive assembly; and
            a compaction element for receiving the fiber element from the guide assembly thereon and pressing the fiber element against the work surface;
    hard tooling formed having at least two recessed pockets therein and wait least one rib extending between a portion of said at least two pockets for said fiber element; and
    consolidation medium having a portion thereof engaging a portion of said at least two recessed pockets in said hard tooling.

2. The apparatus of claim 1, further comprising:
    a resilient member for covering portions of said hard tooling and said consolidation medium.

3. The apparatus of claim 2, further comprising:
    a cover for covering a portion of said resilient member.

4. The apparatus of claim 2, wherein said resilient member is substantially solid.

5. The apparatus of claim 2, wherein said resilient member is inflatable.

6. The apparatus of claim 1, further comprising:
    a cover for covering portions of said hard tooling and said consolidation medium.

7. The apparatus of claim 6, wherein said cover comprises a member having at least two recessed pockets therein and at least one rib extending between a portion of said at least two recessed pockets, said at least two recessed pockets for receiving a portion of said consolidation medium therein.

8. The apparatus of claim 1, wherein said consolidation medium comprises: at least two consolidation blocks, each consolidation block being retained in at least a portion of a recessed pocket of said at least two recessed pockets of said hard tooling.

9. The apparatus of claim 1, wherein said hard tooling further comprises: each recessed pocket of said at least two recessed pockets having at least one aperture therein.

10. The apparatus of claim 9, wherein said hard tooling further comprises:
    at least two consolidation blocks, each consolidation block being retained in at least a portion of a recessed pocket of said at least two recessed pockets of said hard tooling, each consolidation block having a retaining apparatus thereon for mating with the at least one aperture in each recessed pocket of said at least two recessed pockets of said hard tooling.

11. The apparatus of claim 10, wherein the retaining apparatus includes a pin.

12. The apparatus of claim 10, wherein the retaining apparatus includes a resilient member.

13. The apparatus of claim 1, wherein said hard tooling is substantially flat.

14. The apparatus of claim 1, wherein said hard tooling is annular in shape.

15. The apparatus of claim 13, further comprising:
    a cover being substantially annular in shape.

16. The apparatus of claim 1, wherein said hard tooling is any desired shape.

17. The apparatus of claim 16, wherein said cover is any desired shape.

18. The apparatus of claim 1, wherein said consolidation medium is any desired shape.

19. The apparatus of claim 1, wherein said consolidation medium includes a resilient member having at least one consolidation block attached thereto.

20. The apparatus of claim 1, wherein said consolidation medium includes a flexible, resilient member having at least one consolidation block secured thereto.

21. The apparatus of claim 20, wherein said flexible, resilient member includes a chamber therein.

22. The apparatus of claim 21, wherein said flexible, resilient member includes an inflatable member.

23. The apparatus of claim 20, wherein said at least one consolidation block is adhesively secured to said flexible, resilient member.

24. The apparatus of claim 20, wherein said at least one consolidation block is mechanically secured to said flexible, resilient member.

25. The apparatus of claim 1, wherein said consolidation medium includes an inflatable consolidation medium.

26. The apparatus of claim 1, wherein said consolidation medium includes a reinforced, inflatable consolidation medium having at least a portion thereof having, in turn, a profile thereon.

27. The apparatus of claim 1, wherein the frame member is supported by the base mount through a linear slide, and further including an actuator for moving the frame member toward and away from the base mount and an encoder for determining a position of the frame member relative to the base mount.

28. The apparatus of claim 27, wherein the actuator comprises a double-acting pneumatic cylinder.

29. The apparatus of claim 28, wherein the first roller is disposed and oriented to receive a fiber element moving in a downward direction from the spool, and redirect the fiber element forwardly toward the second roller.

30. The apparatus of claim 29, wherein the second roller is disposed and oriented to receive a fiber element moving forwardly from the first roller and redirect the fiber element into the guide assembly.

31. The apparatus of claim 30, wherein the drive assembly includes a servo motor controllable by a machine controller in a closed loop position mode for measuring a length of a fiber element driven thereby.

32. The apparatus of claim 31, wherein the drive assembly further includes a drive roller driven by the servo motor through a timing pulley and timing belt, and a clamp roller selectively movable toward the drive roller with a fiber element therebetween to cause the fiber element to be engaged by the drive roller.

33. The apparatus of claim 32, further including an actuator for moving the clamp roller toward the drive roller.

34. The apparatus of claim 33, wherein the actuator comprises a pneumatic actuator.

35. The apparatus of claim 34, wherein the knife assembly includes a blade selectively movable transversely to and across a path of a fiber element passing through the guide assembly, and an actuator for moving the blade across the fiber element path and retracting the blade.

36. The apparatus of claim 35, wherein the actuator comprises a double-acting pneumatic actuator.

37. The apparatus of claim 36, wherein the guide assembly further includes a guide chute defining a severance gap into which the blade may be received when moved across the fiber element path.

38. The apparatus of claim 37, wherein the knife assemble is rotatably mounted about an axis perpendicular to the fiber element path.

39. The apparatus of claim 38, wherein the compaction element comprises a compaction roller rotatable about a shaft mounted transversely to a path of a fiber element received from the guide assembly.

40. The apparatus of claim 39, wherein the compaction roller is free-wheeling on the shaft.

41. The apparatus of claim 40, wherein the compaction roller is laterally biased toward a position along the shaft.

42. The apparatus of claim 41, wherein the compaction roller is biased from both sides thereof parallel to the shaft.

43. The apparatus of claim 42, wherein the biasing is effected by coil springs carried on the shaft, one on each side of the compaction roller.

44. The apparatus of claim 43, further including an encoder for detecting a position of the compaction roller along the shaft.

45. The apparatus of claim 44, further including a controllable heat source having an outlet adjacent the compaction element.

46. The apparatus of claim 45, wherein the heat source comprises a hot air torch and the outlet comprises a nozzle.

47. The apparatus of claim 46, further including a hood extending over the spool holder and defining a substantially enclosed spool holder zone.

48. The apparatus of claim 47 further including a duct for providing conditioned air to the spool holder zone.

49. The apparatus of claim 48, further including a conditioned air source for providing conditioned air to the duct.

50. The apparatus of claim 49, wherein the spool holder includes a spindle oriented substantially transversely to a direction of movement of the frame member.

51. The apparatus of claim 50, wherein the first and second rollers and guide assembly are positioned and oriented to effect reorientation of the fiber element as received from the spool no more than twice before reaching the compaction element.

52. The apparatus of claim 51, wherein the second roller, guide assembly and compaction element are arranged to define a substantially linear fiber element path between a periphery of the second roller and a periphery of the compaction element.

53. The apparatus of claim 52, wherein the second roller, at least part of the guide assembly, and the compaction element are sized to accommodate a fiber element of a specific width.

54. The apparatus of claim 53, further including a duct for providing conditioned air proximate the guide assembly.

55. The apparatus of claim 54, further including a conditioned air source for providing conditioned air to the duct.

* * * * *

UNITED STATES PATENT AND TRADEMARK OFFICE
CERTIFICATE OF CORRECTION

PATENT NO.   : 6,050,315
DATED        : April 18, 2000
INVENTOR(S)  : Mark E. Deckers et al.

It is certified that error appears in the above-identified patent and that said Letters Patent is hereby corrected as shown below:

Title page,
Item [57], ABSTRACT,
Lines 10-11, delete "Method and apparatus for the manufacture of fiber reinforced structures."

Figure 1:
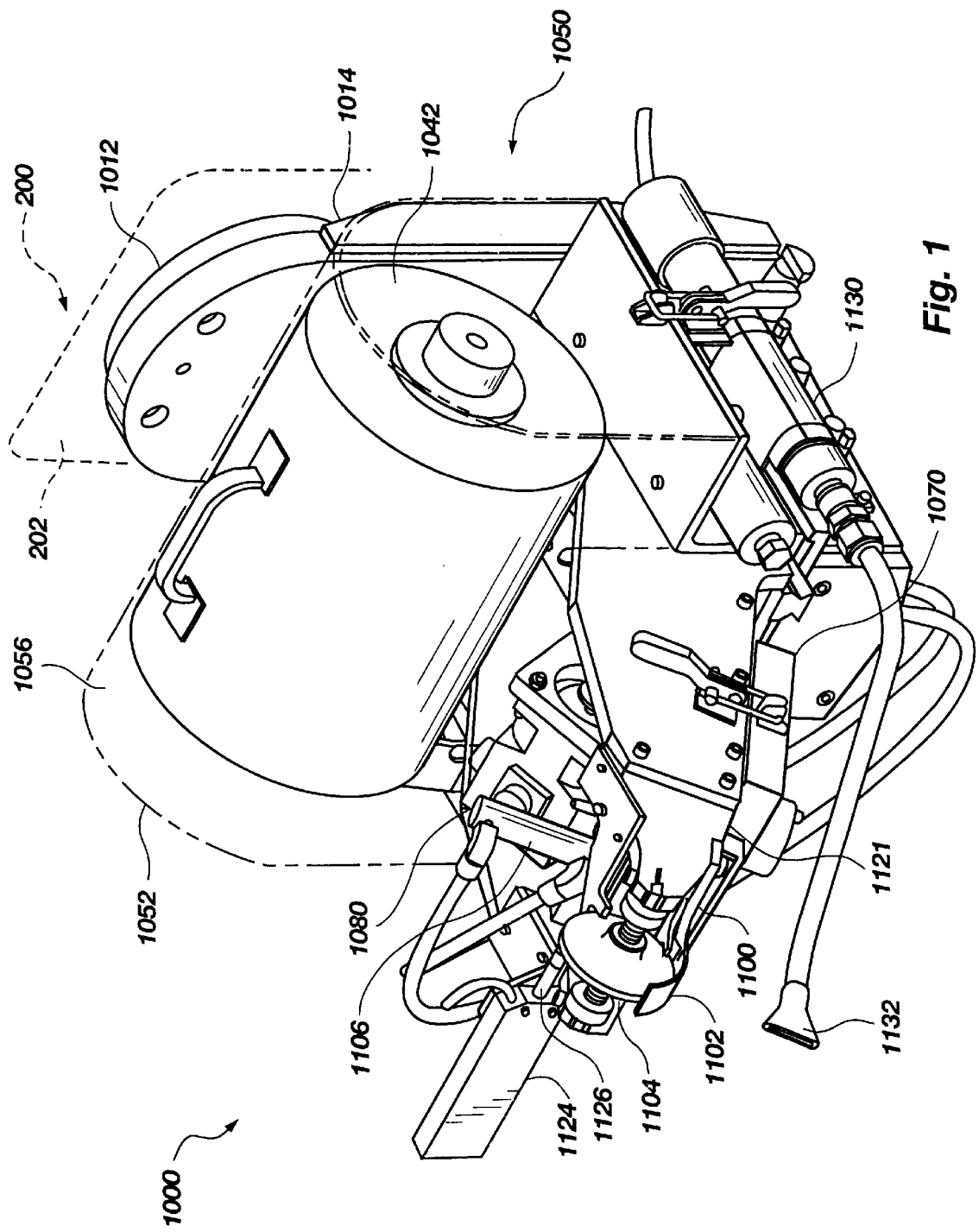
FIG. 1 is an enlarged, right-hand isometric view of a preferred embodiment of the apparatus of the present invention.
Figure 2:
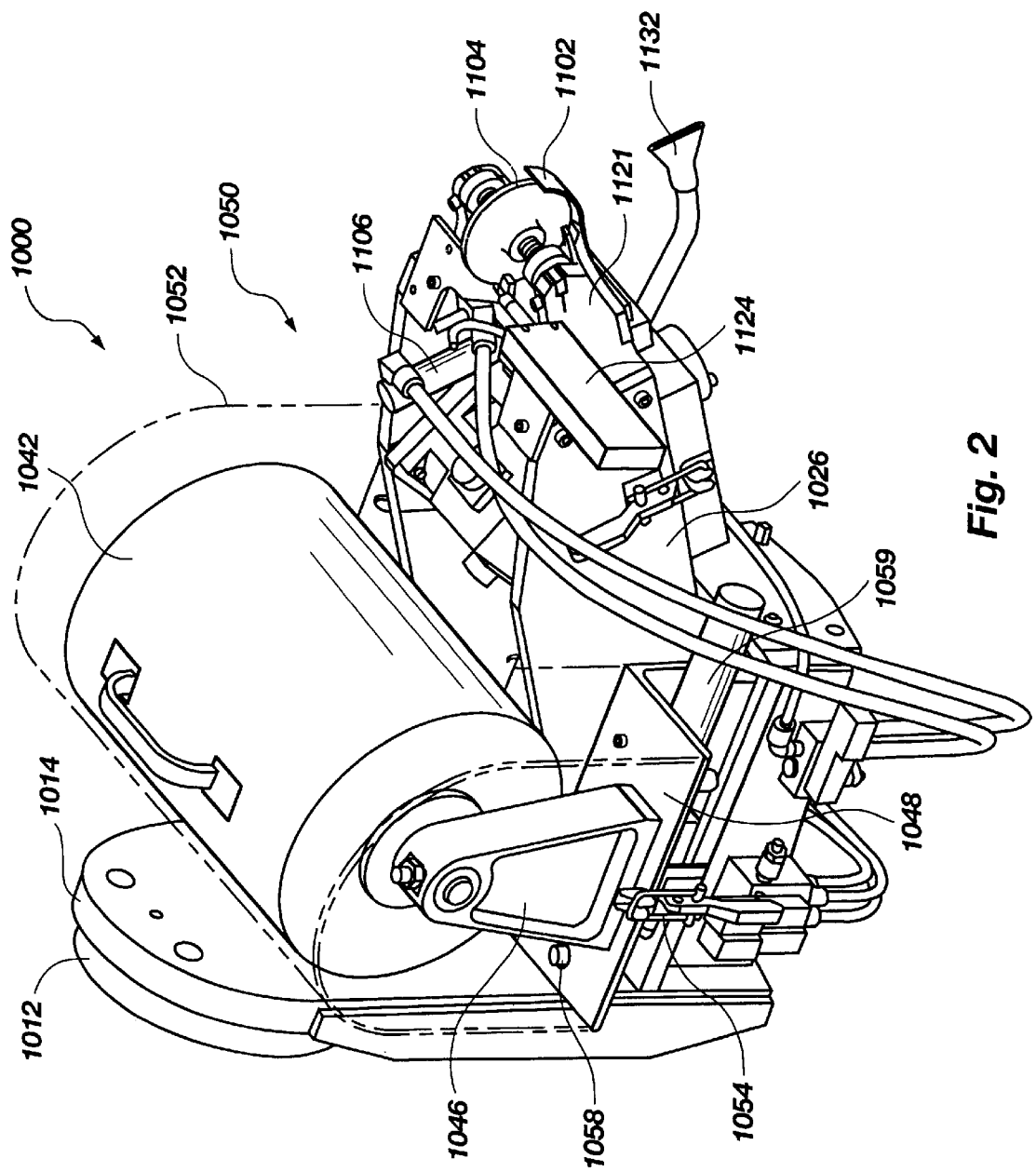
FIG. 2 is a left-hand isometric view of the apparatus shown in drawing FIG. 1.
Figure 3:
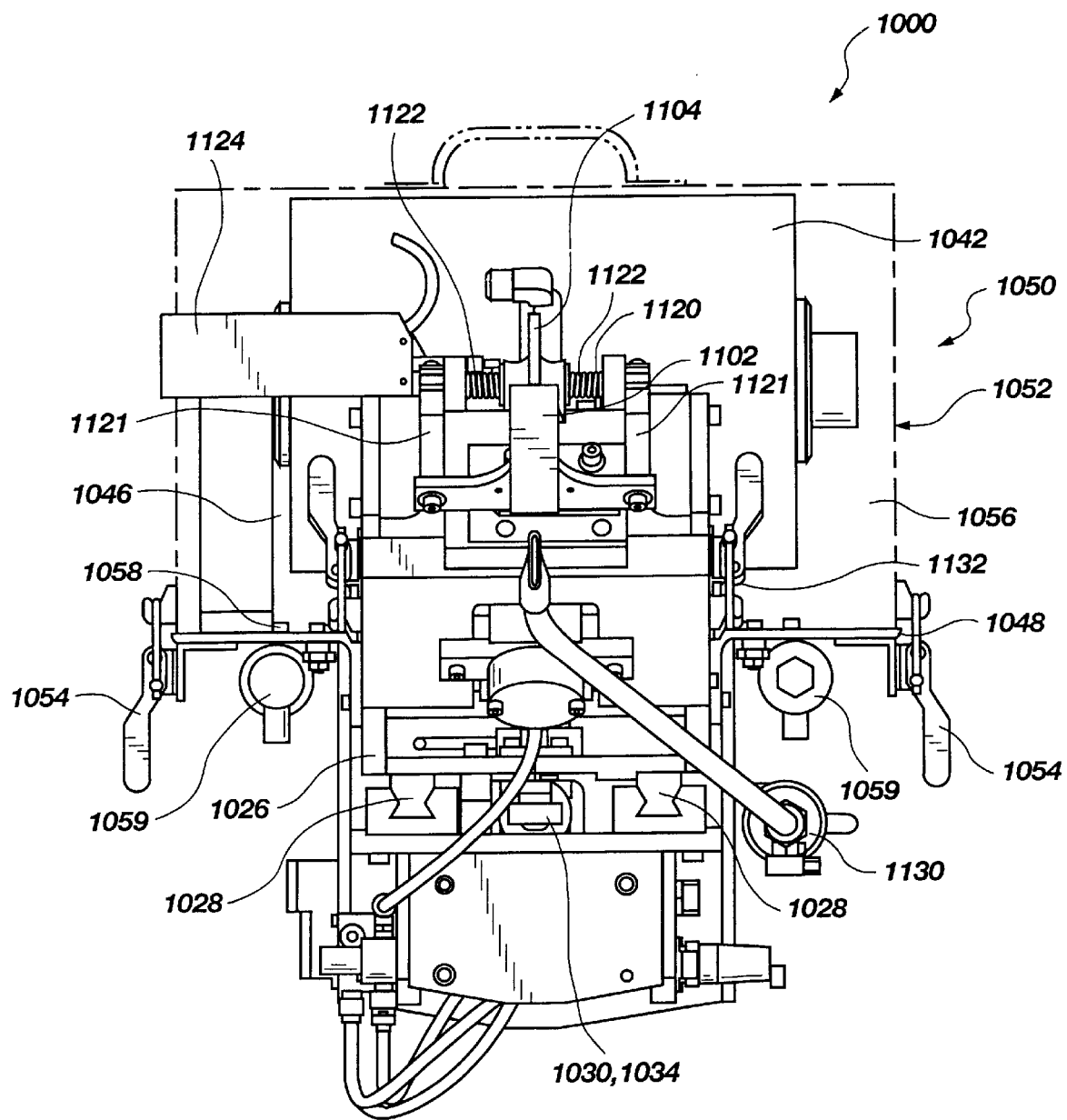
FIG. 3 is a frontal elevational view of the apparatus shown in drawing FIG. 1.
Figure 4:
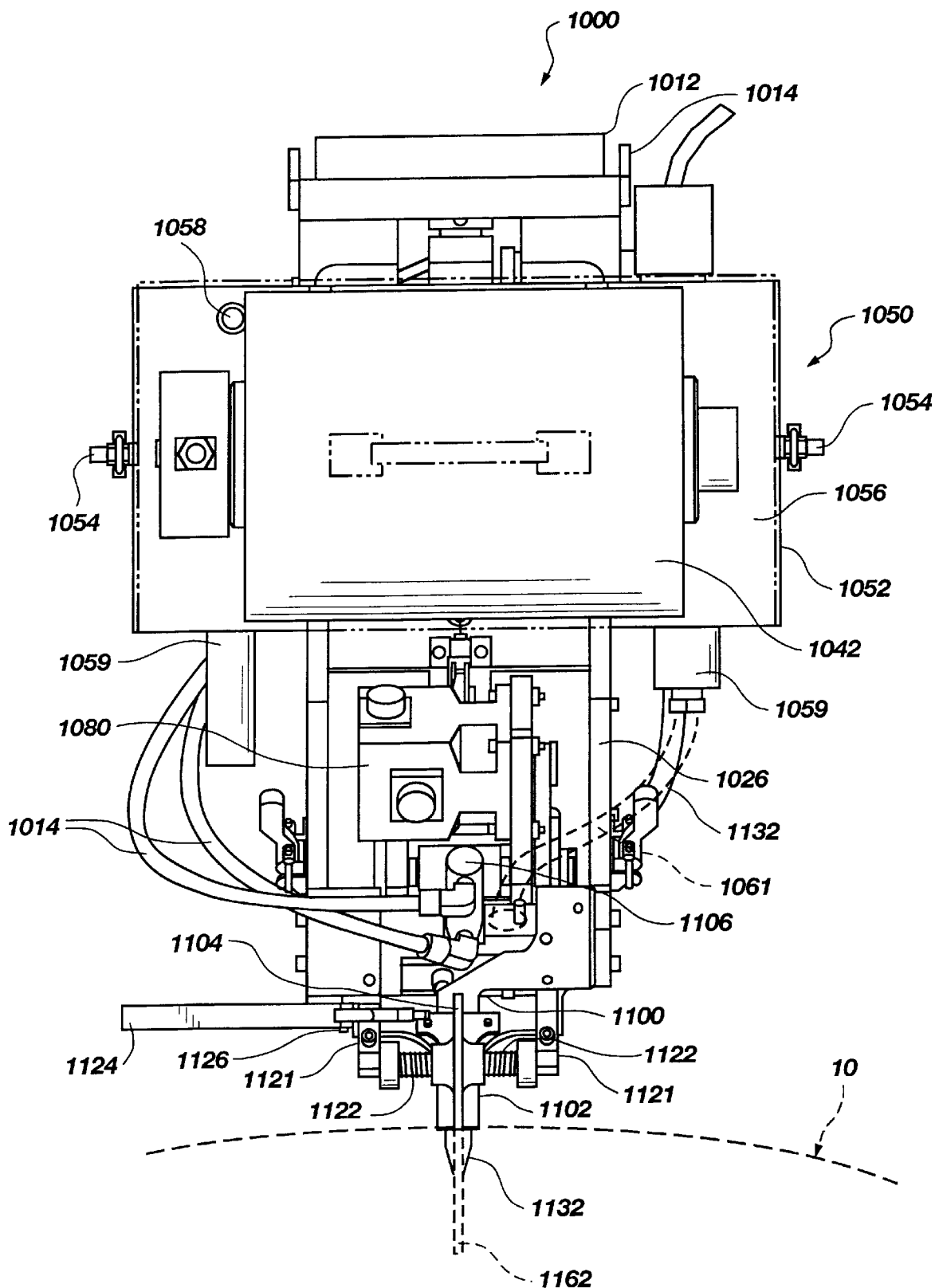
FIG. 4 is a top elevational view of the apparatus shown in drawing FIG. 1.
Figure 7:
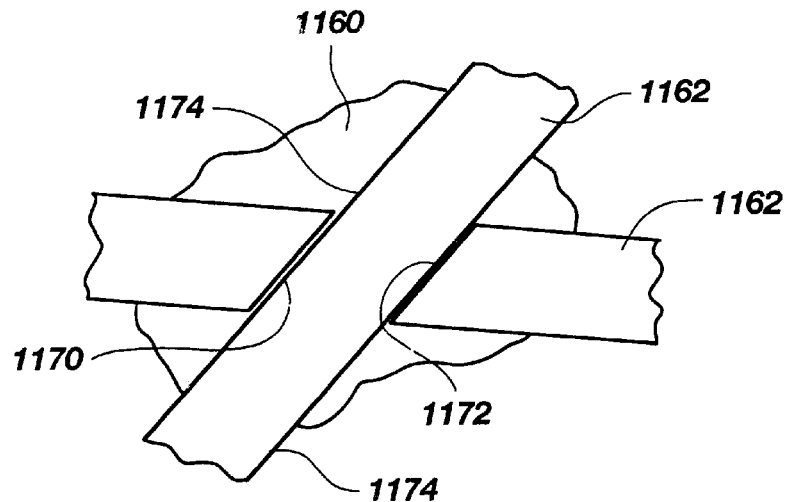
FIG. 7 is a top elevation of abutting tows applied at intersecting angles according to the present invention.
Figure 6:
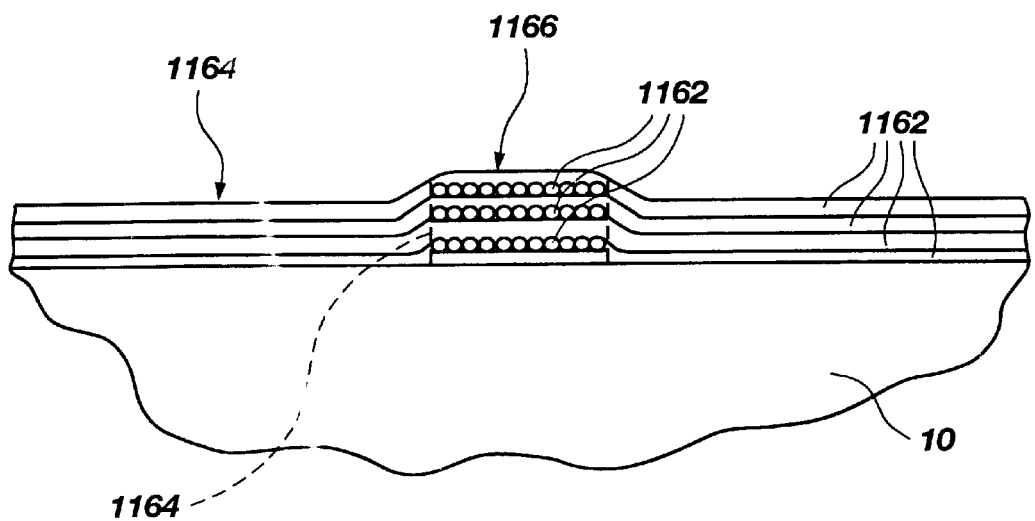
FIG. 6 is a partial cross-sectional view of intersecting groups of stacked tows at a grid node where two stiffening ribs cross.

Drawings,
Figure 1, change "202" to -- 2020 -- and change "200" to -- 2000 --
Figure 4, delete the left-most occurrence of "1014" and delete the right-most occurrence of "1132"
Figure 5, change "200" to -- 2000 --
Figure 7, change "1160" to -- 10 --

Column 2,
Line 23, change "high strength" to -- high-strength --
Line 26, change "far" to -- fan --
Line 32, before "catch" change "of" to -- to --
Line 38, insert a comma after "structure"

Column 4,
Line 59, change "202" to -- 2020 --
Line 60, change "200" to -- 2000 --

Column 5,
Line 1, change "202" to -- 2020 --
Line 11, insert a comma after "actuator"

Column 6,
Line 64, change "104" to -- 1104 --

Column 7,
Line 22, change "1160" to -- 10 --
Lines 35, 42, 49 and 56, change "200" to -- 2000 --

Column 9,
Line 22, change "structurally" to -- structural --
Line 61, change "Within" to -- within --

Column 13,
Line 28, change "strictures" to -- structures --

UNITED STATES PATENT AND TRADEMARK OFFICE
CERTIFICATE OF CORRECTION

PATENT NO.   : 6,050,315
DATED        : April 18, 2000
INVENTOR(S)  : Mark E. Deckers et al.

It is certified that error appears in the above-identified patent and that said Letters Patent is hereby corrected as shown below:

Column 15,
Line 48, change "cavity" to -- chamber --

Column 16,
Line 33, after "area" change "142" to -- 184 --

Column 17,
Line 17, after "area" change "142" to -- 184 --
Line 61, change "201" to -- 200 --

Column 18,
Line 67, change "discreet" to -- discrete -- (Note: the former means modest, while the latter marks a distinction)

Column 19,
Line 4, after "with" and before "tooling" insert -- mating piece of --
Line 35, change "188" to -- 118 --

Column 20,
Line 9, change "wait" to -- at --

Column 22,
Line 3, change "assemble" to -- assembly --

Signed and Sealed this

Second Day of November, 2004

JON W. DUDAS
*Director of the United States Patent and Trademark Office*